(12) United States Patent
Lee et al.

(10) Patent No.: US 11,958,131 B2
(45) Date of Patent: Apr. 16, 2024

(54) ALUMINUM-COATED BLANK, MANUFACTURING METHOD THEREOF AND APPARATUS FOR MANUFACTURING ALUMINUM-COATED BLANK

(71) Applicant: Hyundai Steel Company, Incheon (KR)

(72) Inventors: Chang Yong Lee, Incheon (KR); Jeong Seok Kim, Incheon (KR); Sung Ryul Kim, Incheon (KR); Tae Woo Kwon, Incheon (KR)

(73) Assignee: Hyundai Steel Company, Incheon (KR)

( * ) Notice: Subject to any disclaimer, the term of this patent is extended or adjusted under 35 U.S.C. 154(b) by 2 days.

(21) Appl. No.: 17/089,483

(22) Filed: Nov. 4, 2020

(65) Prior Publication Data

US 2021/0370440 A1 Dec. 2, 2021

(30) Foreign Application Priority Data

Jun. 2, 2020 (KR) .................. 10-2020-0066525

(51) Int. Cl.
| | |
|---|---|
| *B23K 26/322* | (2014.01) |
| *B23K 35/02* | (2006.01) |
| *B23K 103/04* | (2006.01) |
| *C22C 38/02* | (2006.01) |
| *C22C 38/04* | (2006.01) |
| *C22C 38/06* | (2006.01) |

(52) U.S. Cl.
CPC ........ *B23K 26/322* (2013.01); *B23K 35/0261* (2013.01); *C22C 38/02* (2013.01); *C22C 38/04* (2013.01); *C22C 38/06* (2013.01); *B23K 2103/04* (2018.08)

(58) Field of Classification Search
CPC ............ B23K 26/3222; B23K 2103/04; C22C 38/02; C22C 38/04; C22C 38/06
See application file for complete search history.

(56) References Cited

U.S. PATENT DOCUMENTS

| | | | |
|---|---|---|---|
| 9,901,969 B2 | 2/2018 | Miyazaki et al. | |
| 2018/0126437 A1* | 5/2018 | Miyazaki | ............... C22C 38/04 |

(Continued)

FOREIGN PATENT DOCUMENTS

| | | |
|---|---|---|
| CN | 110293312 A | 10/2019 |
| EP | 2737971 A1 | 6/2014 |

(Continued)

*Primary Examiner* — Nathaniel E Wiehe
*Assistant Examiner* — Dilnessa B Belay
(74) *Attorney, Agent, or Firm* — Fox Rothschild LLP

(57) ABSTRACT

Disclosed are an aluminum-coated blank, a manufacturing method thereof, and an apparatus for manufacturing the same. The blank includes two or more aluminum-coated steel sheets connected together by a joint, each of the steel sheets including: a base steel sheet including 0.01-0.5 wt % of carbon, 0.01-1.0 wt % of silicon, 0.5-3.0 wt % of manganese, greater than 0 but not greater than 0.05 wt % of phosphorus, greater than 0 but not greater than 0.01 wt % of sulfur, greater than 0 but not greater than 0.1 wt % of aluminum, greater than 0 but not greater than 0.001 wt % of nitrogen, and the balance of iron and other inevitable impurities; and a coating layer including aluminum and formed on at least one surface of the base steel sheet.

3 Claims, 7 Drawing Sheets

(56) References Cited

U.S. PATENT DOCUMENTS

| | | | | |
|---|---|---|---|---|
| 2018/0326538 A1* | 11/2018 | Breuer | ............... | B32B 15/012 |
| 2019/0003029 A1* | 1/2019 | Oh | ...................... | C22C 38/04 |
| 2020/0180077 A1* | 6/2020 | Riquelme | ............ | B23K 26/044 |

FOREIGN PATENT DOCUMENTS

| | | | | | |
|---|---|---|---|---|---|
| EP | 2832887 | A1 | 2/2015 | | |
| JP | 2013220445 | A | 10/2013 | | |
| JP | 1020180058540 | A | 6/2018 | | |
| KR | 101637084 | B1 | 7/2016 | | |
| KR | 10-2020-0031695 | A | 3/2020 | | |
| WO | 2015132651 | A2 | 9/2015 | | |
| WO | WO-2019042730 | A1 | * 3/2019 | ........... | B23K 26/082 |
| WO | 2019/166941 | A1 | 9/2019 | | |

\* cited by examiner

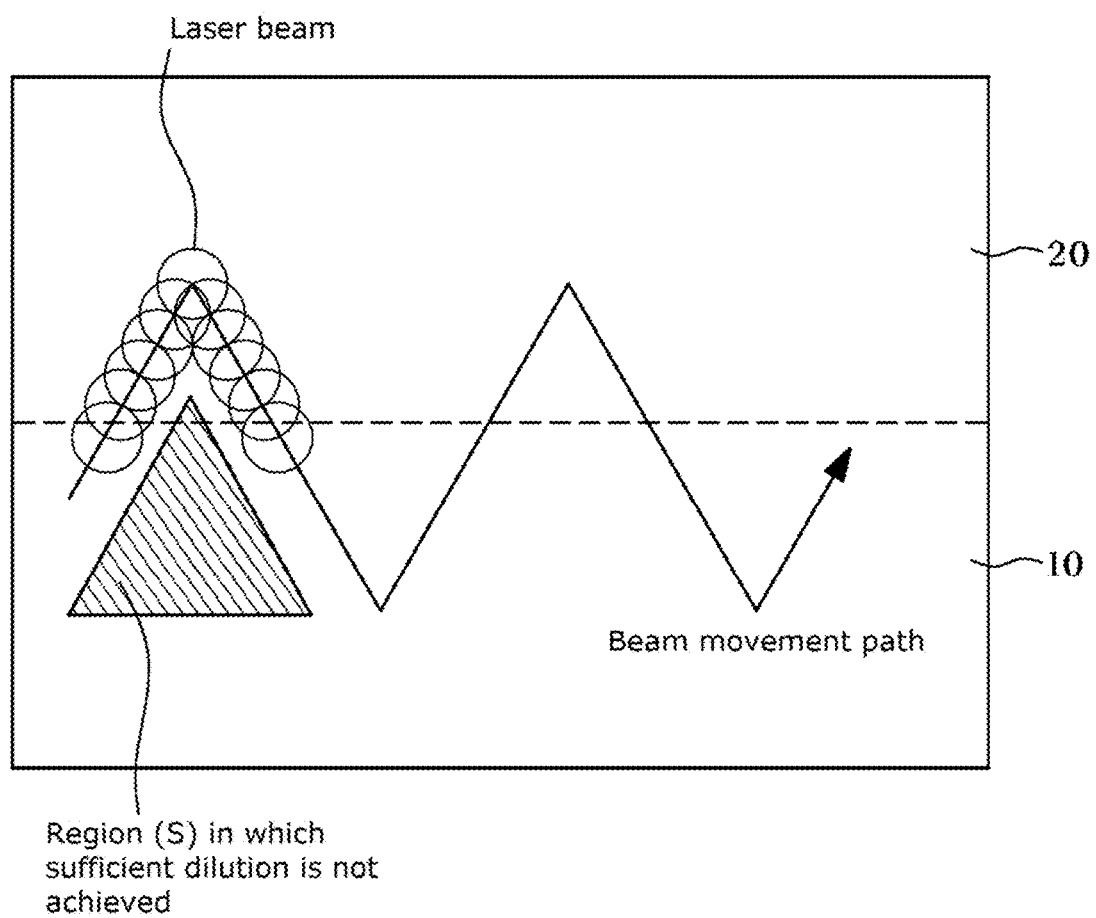

FIG. 5A
FIG. 5B
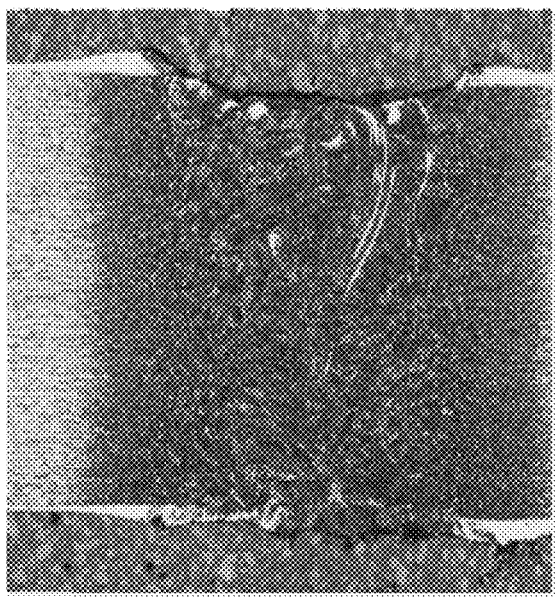
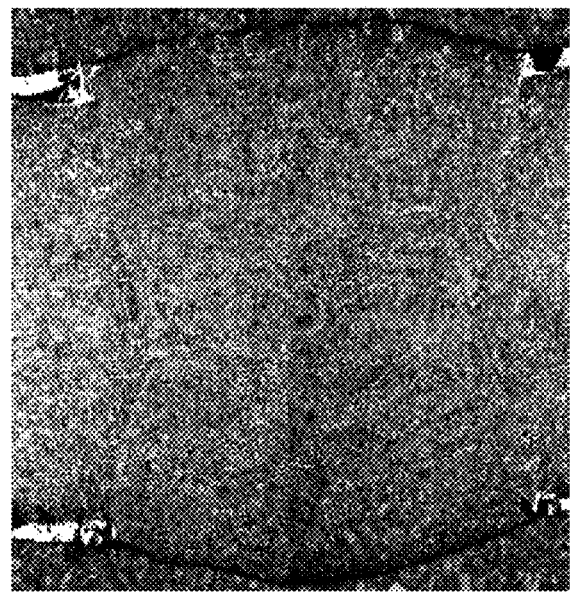

FIG. 7A
FIG. 7B
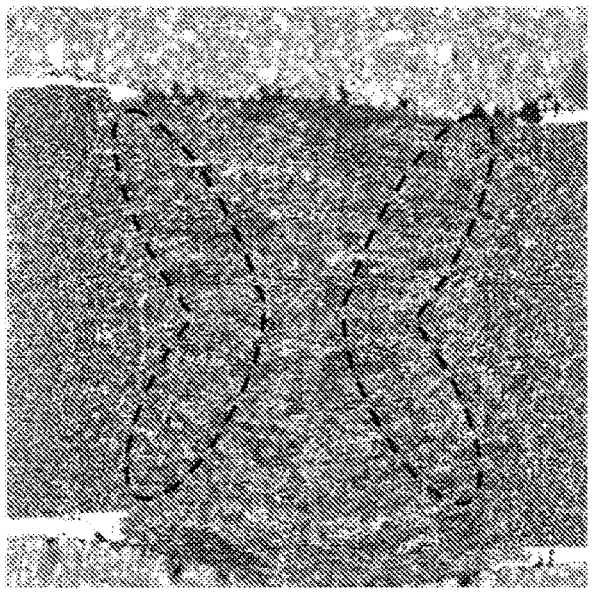
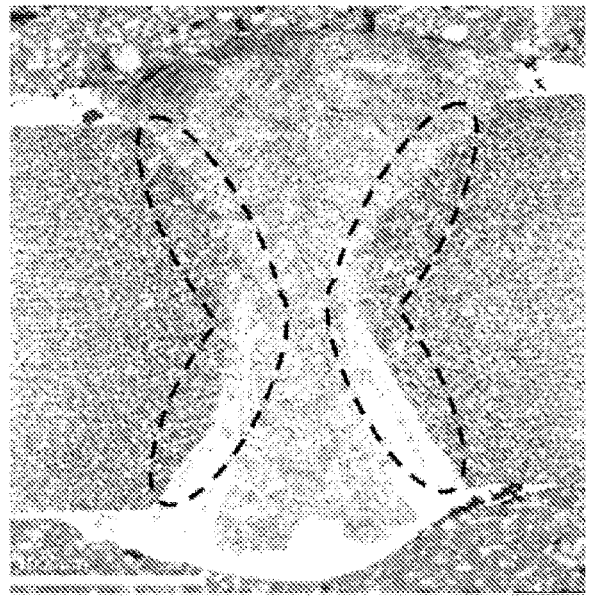

ALUMINUM-COATED BLANK, MANUFACTURING METHOD THEREOF AND APPARATUS FOR MANUFACTURING ALUMINUM-COATED BLANK

CROSS-REFERENCE TO RELATED APPLICATION

This application claims the benefit of Korean Patent Application No. 10-2020-0066525, filed in the Korean Intellectual Property Office on Jun. 2, 2020, the entire contents of which are incorporated herein by reference.

TECHNICAL FIELD

The present invention relates to an aluminum-coated blank, a manufacturing method thereof, and an apparatus for manufacturing the aluminum-coated blank.

BACKGROUND

Parts having various strengths are used in vehicles. For example, parts which need to absorb energy in the event of a vehicle crash or rollover require relatively low strength, and parts whose shape needs to be retained to preserve the occupants' survival space require relatively high strength.

This is because if the parts which need to absorb energy in the event of a vehicle crash have excessively high strength, problems arise in that the impact energy of the crash is not adequately absorbed by the parts and is transferred to other parts, so that an excessive impact is transferred to the occupants and other parts of the vehicle.

As lightweighting and cost reduction of vehicles have been continuously demanded, it has been necessary for a single part to have different strengths for different portions thereof. For example, a portion of the single part requires high strength to protect the occupants, whereas the other portion of the single part requires relatively low strength to absorb the impact energy.

Representative examples of these parts may include a B-pillar of a vehicle. The lower portion of the B-pillar requires relatively low tensile strength and the upper portion thereof requires relatively high tensile strength. The B-pillar requires both a portion whose shape needs to be retained at high strength in the event of a vehicle crash (i.e. an upper portion that needs to support the roof of a vehicle in the event of a vehicle rollover) and a portion that needs to absorb the impact while being crushed in the event of a vehicle crash (i.e. a lower portion having a high possibility of a side collision with another vehicle).

In addition, since the shape of the upper portion of the B-pillar needs to be retained in order to secure a safe space that can prevent injury to occupants, the upper portion requires high strength. If the strength of the upper portion of the B-pillar is not ensured, the roof of the vehicle collapses in the event of a vehicle rollover, thus posing a great threat to the safety of the occupants. However, since the lower portion of the B-pillar needs to absorb the impact energy while being deformed in the event of a vehicle crash or rollover, it requires relatively low strength. This is because if the lower portion of the B-pillar also has high strength, it will not absorb crash energy in the event of a side crash, and thus the crash impact will be transferred to other structural materials.

Although specific strength required for the B-pillar varies depending on the type or shape of the vehicle, the upper portion of the B-pillar requires a tensile strength of about 1,500 MPa, whereas the lower portion of the B-pillar requires a tensile strength of about 500 to 1,000 MPa.

In the related art, a method including forming a part made of a low-strength material and then attaching a separate reinforcing material to a portion of the part, which requires high strength has been used. However, when a single part requires different strengths for different portions thereof, a material having high hardenability (or a material having a large thickness) is used for the upper portion of the single part, and a material having low strength and low hardenability (or a material having a small thickness) is used for the lower portion thereof. The two materials are laser-welded together to make a blank, and a final product is manufactured by subjecting the blank to a hot-stamping process.

Meanwhile, a tailor-welded blank (TWB) is a part manufactured by joining two or more steel sheet materials having different materials and thicknesses. For this TWB, steel sheet materials having an Al—Si coating layer on the surface thereof are used. Meanwhile, in a process of manufacturing a tailor-welded blank using such coated steel sheet materials, the coated steel sheets are laser-welded together and, at the same time, a filler wire containing carbon (C) and manganese (Mn) components is injected therebetween. Thus, even if the aluminum (Al) component on the surface of each steel sheet is incorporated into molten metals, it is possible to ensure a full-martensite structure during hot-stamping molding at a temperature of 850 to 1,000° C.

However, if the coated steel sheets are laser-welded together, the components of the coating layer are incorporated into the melt pool of the weld (joint), and hence the joint has physical properties different from those of the base metals. If the coating layer is based on aluminum-silicon (Al—Si) or zinc (Zn), the components of the coating layer are incorporated into the joint during laser welding, resulting in deterioration in mechanical properties.

This deterioration in the strength of the joint may be solved or minimized by the components of a filler wire. However, in this case, a problem may arise in that the coating layer component (Al) incorporated depending on a material (a material having a high coating weight) and welding conditions (high welding speed) is not uniformly diluted in the base metals, thus causing segregation. Thus, the filler wire component alone may not exhibit a sufficient effect.

SUMMARY

In one preferred aspect, provided is an aluminum-coated blank that may minimize deterioration in the hardness and physical properties of a joint of the blank.

In one preferred aspect, provided is an aluminum-coated blank that may prevent the occurrence of defects such as segregation in a joint of the blank.

In one preferred aspect, provided is an aluminum-coated blank that may minimize deterioration in the physical properties of a joint of the blank after a hot-stamping process.

In one preferred aspect, provided is a method for manufacturing the aluminum-coated blank.

In one preferred aspect, provided is an apparatus for manufacturing the aluminum-coated blank.

In one aspect, provided is an aluminum-coated blank. Preferably, the aluminum-coated blank may be an aluminum-coated blank including two or more aluminum-coated steel sheets connected together by a joint.

Each of the aluminum-coated steel sheets may include: a base steel sheet including an amount of about 0.01 to 0.5 wt % of carbon (C), an amount of about 0.01 to 1.0 wt % of silicon (Si), an amount of about 0.5 to 3.0 wt % of manganese (Mn), an amount greater than 0 but not greater than about 0.05 wt % of phosphorus (P), an amount greater than 0 but not greater than about 0.01 wt % of sulfur (S), an amount greater than 0 but not greater than about 0.1 wt % of aluminum (Al), an amount greater than 0 but not greater than about 0.001 wt % of nitrogen (N), and the balance of iron (Fe), based on the total weight of the base steel sheet, and other inevitable impurities; and a coating layer including aluminum (Al) and formed on at least one surface of the base steel sheet in a coating weight of 20 to 100 g/m$^2$. Preferably, the joint may include a composition including an amount of about 0.2 to 2.0 wt % of aluminum (Al), based on the total weight of the composition, but the composition does not form ferrite at a temperature equal to or greater than the highest Ac3 temperature among the Ac3 temperatures of the two or more aluminum-coated steel sheets.

The term "Ac3 temperature" as used herein is a highest or critical temperature at which a ferrite phase of a metal material (e.g., steel) is completely transformed into an austenite phase of the metal material as a temperature rises, e.g., during heating.

Preferably, the average hardness of the joint is equal to or higher than the average hardness of the base steel sheet. For example, after the aluminum-coated blank is subjected to hot-stamping molding by heating to the Ac3 temperature or above, press molding, and cooling to 300° C. or below at a cooling rate of 10 to 500° C./sec, the average hardness of the joint is equal to or higher than the average hardness of the base steel sheet.

For example, the average hardness of the joint suitably may be equal to or 1, 3, 5, 6, 7, 8, 9, 10, 15, 20, 30 40 or 50 percent greater than the average hardness of the base steel sheet, where such hardness values by be suitably determined by KS B 0811 (Method for Vickers hardness test for metallic materials) standard.

In one embodiment, the hardness value of the aluminum-coated blank may be a value measured by applying a load of 300 g according to KS B 0811 (Method for Vickers hardness test for metallic materials) standard. In addition, the KS B 0811 standard is a reference to ISO 6507 standard.

In one embodiment, the average hardness value of the joint is calculated by measuring the hardness values of five points spaced at regular intervals on the joint of the aluminum-coated blank subjected to the hot-stamping heat treatment and averaging the measured hardness values.

In one embodiment, the average hardness value of the base steel sheet may be calculated by measuring the hardness values of five points, spaced at the same intervals as when measuring the average hardness value of the joint, on the base steel sheet of the aluminum-coated blank subjected to the hot-stamping heat treatment, and averaging the measured hardness values.

The base steel sheet may further include one or more selected from the group consisting of niobium (Nb), titanium (Ti), chromium (Cr), molybdenum (Mo), and boron (B).

The coating layer may include: a surface layer formed on the surface of the base steel sheet and including an amount of about 80 wt % or greater of aluminum (Al) based on the total weight of the surface layer; and an alloy layer formed between the surface layer and the base steel sheet and including aluminum-iron (Al—Fe), aluminum-iron-silicon (Al—Fe—Si) intermetallic compounds, and an amount of about 20 to 70 wt % of iron (Fe) based on the total weight of the alloy layer.

The joint may have a microstructure including about 90 area % or greater of martensite after the hot-stamping molding.

In one preferred aspect, provided is a method for manufacturing the aluminum-coated blank. The method for manufacturing the aluminum-coated blank may include: aligning two or more aluminum-coated steel sheets such that the edge of one of the aluminum-coated steel sheets faces the edge of the other aluminum-coated steel sheet; and providing a filler wire to the facing portions of the aluminum-coated steel sheets, and melting the facing portions of the aluminum-coated steel sheets and the filler wire by laser beam irradiation from a laser head to form a joint.

The steel sheets may be joined together by irradiating a laser beam so as to form a pattern at a predetermined angle with respect to the formation direction of the joint.

Preferably, the laser beam has a frequency of about 100 to 1,500 Hz and a power of about 1 to 20 kW, the joint may be formed at a speed of about 15 to 170 mm/sec.

Each of the aluminum-coated steel sheets may include: a base steel sheet including an amount of about 0.01 to 0.5 wt % of carbon (C), an amount of about 0.01 to 1.0 wt % of silicon (Si), an amount of about 0.5 to 3.0 wt % of manganese (Mn), an amount greater than 0 but not greater than about 0.05 wt % of phosphorus (P), an amount greater than 0 but not more than about 0.01 wt % of sulfur (S), an amount greater than 0 but not greater than about 0.1 wt % of aluminum (Al), an amount greater than 0 but not greater than about 0.001 wt % of nitrogen (N), and the balance of iron (Fe), based on the total weight of the base steel sheet, and other inevitable impurities; and a coating layer including aluminum (Al) and formed on at least one surface of the base steel sheet in a coating weight of about 20 to 100 g/m$^2$.

After the aluminum-coated blank is subjected to hot-stamping molding by heating to the Ac3 temperature or above, press molding, and cooling to about 300° C. or below at a cooling rate of about 10 to 500° C./sec, the average hardness of the joint may be equal to or greater than the average hardness of the base steel sheet.

The filler wire may include an austenite stabilizing element.

The pattern may be formed by movement of one or more of the coated steel sheets and the laser head during the laser beam irradiation.

The joint may be formed at a speed of about 15 to 120 mm/sec, and the frequency of the laser beam, the radius of the laser beam and the formation speed of the joint may satisfy the relationship represented by the following equation 1:

$$\left(\frac{f \times r}{v}\right)^{\alpha} \geq 1 \qquad \text{[Equation 1]}$$

wherein α is 0.7, f is the frequency (Hz) of the laser beam, r is the radius (mm) of the laser beam, measured on the surface of each of the aluminum-coated steel sheets, and v is the speed (mm/sec) at which the joint is formed.

In one preferred aspect, provided is an apparatus for manufacturing the aluminum-coated blank. The apparatus for manufacturing the aluminum-coated blank may include two or more aluminum-coated steel sheets connected together by a joint. The apparatus may include: a laser generating unit configured to generate laser light; a steel sheet loading unit on which two or more aluminum-coated steel sheets are disposed such that the edge of one of the aluminum-coated steel sheets faces the edge of the other aluminum-coated steel sheet; a filler wire supply unit configured to supply a filler wire for forming the joint between the coated steel sheets; and a laser head configured to irradiate a laser beam to the facing portions of the aluminum-coated steel sheets and the supplied filler wire using the laser light supplied from the laser generating unit.

The steel sheets may be joined together by irradiating a laser beam so as to form a pattern at a predetermined angle with respect to the formation direction of the joint, the laser beam may have a frequency of about 100 to 1,500 Hz and a power of about 1 to 20 kW. The joint may be formed at a speed of about 15 to 170 mm/sec.

The pattern may be formed by movement of one or more of the coated steel sheets and the laser head during the laser beam irradiation.

The aluminum-coated blank according to various exemplary embodiments of the present invention, which is manufactured by joining two or more aluminum-coated steel sheets having at least one of different strengths and thicknesses, may minimize deterioration in the hardness and physical properties of a joint between the steel sheets, prevent the occurrence of defects such as segregation in the joint between the steel sheets, and minimize joint breakage caused by phase change of the segregation into an Al—Fe intermetallic compound in an hot-stamping process.

Other aspects of the invention are disclosed infra.

BRIEF DESCRIPTION OF THE DRAWINGS

FIG. 3 shows a region in which the components of a coating layer are not sufficiently diluted in the components of a base steel sheet in a process of joining aluminum-coated steel sheets together by laser beam irradiation.

FIG. 5A is an optical micrograph showing the cross-section of an aluminum-coated blank manufactured by a conventional method, and FIG. 5B is an optical micrograph showing the cross-section of an aluminum-coated blank of Example 1.

FIG. 7A is an optical micrograph showing the cross-section of an aluminum-coated blank of Example 34, and FIG. 7B is an optical micrograph showing the cross-section of an aluminum-coated blank of Comparative Example 28.

DETAILED DESCRIPTION OF THE ILLUSTRATED EMBODIMENTS

Figure 1:
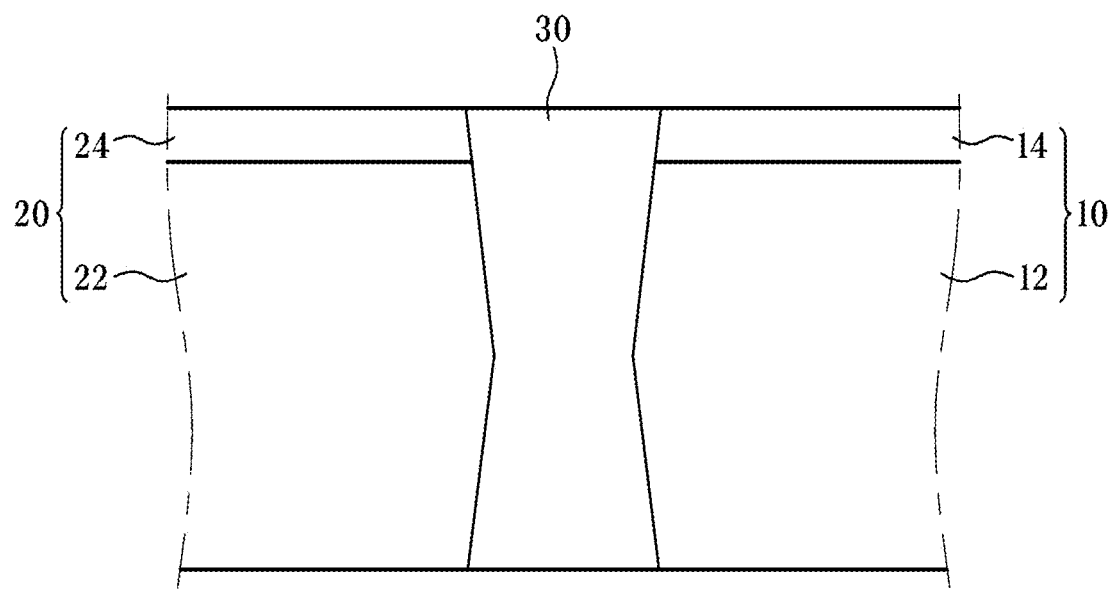
FIG. 1 illustrates an aluminum-coated blank according to one embodiment of the present invention.

Hereinafter, the present invention will be described in detail. In the following description, the detailed description of related publicly-known technology or configuration will be omitted when it may unnecessarily obscure the subject matter of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In addition, the terms used in the following description are terms defined in consideration of the functions in the present invention, and may be changed in accordance with the option of a user or operator or a usual practice. Accordingly, the definition of the terms should be made based on the contents throughout the present specification.

Aluminum-Coated Blank

In an aspect, provided is an aluminum-coated blank. FIG. 1 illustrates an aluminum-coated blank. An aluminum-coated blank 100 may include two or more aluminum-coated steel sheets 10 and 20 connected together by a joint 30. Each of the aluminum-coated steel sheets may include: a base steel sheet 12 or 22 including an amount of about 0.01 to 0.5 wt % of carbon (C), an amount of about 0.01 to 1.0 wt % of silicon (Si), an amount of about 0.5 to 3.0 wt % of manganese (Mn), an amount greater than 0 but not greater than about 0.05 wt % of phosphorus (P), an amount greater than 0 but not greater than about 0.01 wt % of sulfur (S), an amount greater than 0 but not greater than about 0.1 wt % of aluminum (Al), an amount greater than 0 but not greater than about 0.001 wt % of nitrogen (N), and the balance of iron (Fe), based on the total weight of the base steel sheet, and other inevitable impurities; and a coating layer 14 or 24 including aluminum (Al) and formed on at least one surface of the base steel sheet 12 or 22 in a coating weight of about 20 to 100 g/m².

The joint 30 may include a composition including an amount of about 0.2 to 2.0 wt % of aluminum (Al) based on the total weight of the composition, and the composition that does not form ferrite at a temperature equal to or greater than the highest Ac3 temperature among the Ac3 temperatures of the two or more aluminum-coated steel sheets.

Preferably, the joint 30 may include the composition that does not form ferrite at a temperature of about 850° C. or above. For example, the joint may include the composition that may have a microstructure including 90 area % or more of martensite after the aluminum-coated blank is subjected to a hot-stamping process in which the aluminum-coated blank is heated to a temperature of about 850 to 1,000° C., press-molded, and cooled rapidly at an average cooling rate of about 10 to 500° C./sec. For example, the joint may be composed of a composition that may have a microstructure including about 90 area % to 100 area % of martensite.

After the aluminum-coated blank is subjected to hot-stamping molding by heating to the Ac3 temperature or above, press molding and cooling to a temperature of about 300° C. or below at a cooling rate of about 10 to 500° C./sec, the average hardness of the joint may be equal to or higher the highest average hardness among the average hardnesses of the two or more base steel sheets. Preferably, the lowest hardness of the joint may be equal to or greater than the average hardness of each of the base steel sheets.

Base Steel Sheets

Hereinafter, the alloying components of the base steel sheets will be described in more detail.

Carbon (C)

Carbon (C) is a major element that determines the strength and hardness of the steel, and may be added for the purpose of ensuring the tensile strength of the steel after a hot-stamping (or hot press) process. In addition, carbon may be added for the purpose of ensuring hardenability properties. Preferably, the carbon may be included in an amount of about 0.01 to 0.5 wt % based on the total weight of the base steel sheet. When carbon is included in an amount of less than about 0.01 wt %, it may be difficult to achieve the mechanical strength of the present invention, and when carbon is included in an amount of greater than about 0.5 wt %, a problem may arise in that the toughness of the steel deteriorates or it is difficult to control the brittleness of the steel.

Silicon (Si)

Silicon (Si) acts as a ferrite stabilizing element in the steel sheet. Silicon may improve ductility by purifying ferrite and improve the carbon concentration in austenite by suppressing formation of low-temperature carbides. Furthermore, silicon is a key element for hot rolling, cold rolling, hot-stamped structure homogenization (control of pearlite bands or manganese segregation), and fine dispersion of ferrite. Preferably, silicon may be included in an amount of about 0.01 to 1.0 wt % based on the total weight of the base steel sheet. When silicon is included in an amount of less than about 0.01 wt %, it may not sufficiently exhibit the above-described functions, and when silicon is included in an amount of greater than about 1.0 wt %, hot rolling and cold rolling loads may increase, and red scale in hot rolling may become excessive, and the joining property of the steel sheets may deteriorate.

Manganese (Mn)

Manganese (Mn) is added for the purpose of increasing hardenability during heat treatment and strength. Preferably, manganese may be added in an amount of about 0.5 to 3.0 wt % based on the total weight of the base streel sheet. When manganese is included in an amount of less than about 0.5 wt %, the steel properties (hard phase fraction) after hot stamping is highly likely to be insufficient due to insufficient hardenability, and when manganese is included in an amount of greater than about 3.0 wt %, ductility and toughness may be reduced due to manganese segregation or pearlite bands, a decrease in bending performance may be caused, and a heterogeneous microstructure may occur.

Phosphorus (P)

Phosphorus (P) is an element that easily segregates and impairs the toughness of the steel. Preferably, phosphorus (P) may be included in an amount greater than 0 but not greater than about 0.05 wt % based on the total weight of the base steel sheet. When phosphorus is included in an amount within this range, it is possible to prevent deterioration in toughness. When phosphorus is included in an amount of greater than about 0.05 wt %, it may cause cracks during processes and form iron phosphide compounds that reduce toughness.

Sulfur (S)

Sulfur (S) is an element that impairs workability and physical properties. Preferably, sulfur may be included in an amount of greater than 0 but not greater than about 0.01 wt % based on the total weight of the base steel sheet. When sulfur is included in an amount of greater than about 0.01 wt %, it may impair hot workability and cause surface defects such as cracks by producing large inclusions.

Aluminum (Al)

Aluminum (Al) acts as a deoxidizing agent for removing from oxygen from the steel. Preferably, aluminum may be included in an amount greater than 0 but not greater than about 0.1 wt % based on the total weight of the base steel sheet. When aluminum is included in an amount of greater than about 0.1 wt %, it may cause nozzle clogging during steel making, and hot brittleness may occur due to aluminum oxide or the like during casting, so that cracks may occur or ductility may be reduced.

Nitrogen (N)

When a large amount of nitrogen (N) is added, the amount of dissolved nitrogen increases, thereby reducing the impact characteristics and elongation of the steel sheet and significantly reducing the toughness of the joint. Preferably, nitrogen may be included in an amount greater than 0 but not greater than about 0.001 wt % based on the total weight of the base steel sheet. When nitrogen is included in an amount of greater than about 0.001 wt %, the impact characteristics and elongation of the steel sheet may be reduced, and the toughness of the joint may be reduced.

Preferably, the base steel sheet may further include one or more of niobium (Nb), titanium (Ti), chromium (Cr), molybdenum (Mo), and boron (B).

Niobium (Nb)

Niobium (Nb) may be added for the purpose of increasing strength and toughness by reducing the martensite packet size. Preferably, niobium may be included in an amount of about 0.005 to 0.1 wt % based on the total weight of the base steel sheet. When niobium is included in an amount within this range, it may exhibit an excellent effect of refining the grains of the steel in hot-rolling and cold-rolling processes, and it is possible to prevent the occurrence of cracks in the slab during steel making and continuous casting and the occurrence of brittle fractures in the product and minimize the generation of coarse precipitates during steel making.

Titanium (Ti)

Titanium (Ti) may be added for the purpose of enhancing hardenability and steel properties by forming precipitates after hot-stamping heat treatment. In addition, titanium effectively contributes to refinement of austenite grains by forming precipitated phases such as Ti(C,N) at high temperature. Moreover, B-hardenability effect may be obtained by TiN formation and the upper and lower limits of the amount of titanium may be added. Preferably, titanium may be included in an amount of about 0.005 to 0.1 wt % based on the total weight of the base steel sheet. When titanium is included in an amount within this range, it is possible to prevent continuous casting defects and coarsening of precipitates, easily ensure physical properties of the steel, and prevent the occurrence of defects such as cracks on the surface of the steel.

Chromium (Cr)

Chromium (Cr) may be added for the purpose of improving the hardenability and strength of the aluminum-coated steel sheet. Preferably, chromium may be included in an amount of about 0.01 to 0.5 wt % based on the total weight of the base steel sheet. When chromium is included in an amount within this range, it may improve the hardenability and strength of the aluminum-coated steel sheet, and it is possible to prevent the production cost from increasing and the toughness of the steel from being degraded.

Molybdenum (Mo)

Molybdenum (Mo) may contribute to strength improvement by suppressing coarsening of precipitates during hot rolling and hot stamping and increasing hardenability. Molybdenum (Mo) may be included in an amount of about 0.001 to 0.008 wt % based on the total weight of the base steel sheet. When molybdenum is included in an amount within this range, it may exhibit an excellent effect of suppressing coarsening of precipitates during hot rolling and hot stamping and increasing hardenability.

Boron (B)

Boron (B) is added for the purpose of ensuring the hardenability and strength of the steel by ensuring a martensite structure, and has an effect of refining grains by increasing the austenite grain growth temperature. Preferably, boron may be included in an amount of about 0.001 to 0.008 wt % based on the total weight of the base steel sheet. When boron is included in an amount within this range, it is possible to prevent the occurrence of grain boundary brittleness in hard phases and ensure high toughness and bendability.

Preferably, the aluminum-coated steel sheet may be manufactured by a method including steps of: reheating a steel slab including an amount of about 0.01 to 0.5 wt % of carbon (C), an amount of about 0.01 to 1.0 wt % of silicon (Si), an amount of about 0.5 to 3.0 wt % of manganese (Mn), an amount greater than 0 but not greater than about 0.05 wt % of phosphorus (P), an amount greater than 0 but not greater than about 0.01 wt % of sulfur (S), an amount greater than 0 but not greater than about 0.1 wt % of aluminum (Al), an amount greater than 0 but not greater than about 0.001 wt % of nitrogen (N), and the balance of iron (Fe), based on the total weight of the an amount greater and other inevitable impurities; finish-hot-rolling the reheated slab; coiling the hot-rolled steel sheet; cold-rolling the coiled steel sheet; annealing the cold-rolled steel sheet; and forming a coating layer on the surface of the annealed steel sheet.

Coating Layer

The coating layer may be formed on at least one surface of the base steel sheet in a coating weight of about 20 to 100 g/m² on a one side basis and include aluminum (Al) based on the total weight of the coating layer. Preferably, the coating layer may be formed by a method including a step of immersing the base steel sheet in a coating bath containing at least one of molten aluminum and aluminum alloy at about 600 to 800° C., and then cooling the base steel sheet at an average cooling rate of about 1 to 50° C./sec.

Preferably, after the base steel sheet is immersed in the coating bath, the coating weight may be controlled by spraying at least one of air and gas onto the surface of the base steel sheet to wipe the molten coating layer while controlling the spray pressure.

The coating layer may be formed on at least one surface of the base steel sheet in a coating weight of about 20 to 150 g/m². Preferably, the coating layer is formed on at least one surface of the base steel sheet in a coating weight of about 20 to 100 g/m². When the coating weight is less than about 20 g/m², the corrosion resistance of the steel sheet may be reduced, and when the coating weight is greater than about 100 g/m², the amount of aluminum (Al) incorporated into the joint during joining of the aluminum-coated steel sheets may increase, so that the strength of the joint may be lowered after hot stamping.

Preferably, the coating layer may include: a surface layer formed on the surface of the base steel sheet and including an amount of about 80 wt % or greater of aluminum (Al) based on the total weight of the coating layer; and an alloy layer formed between the surface layer and the base steel sheet and including aluminum-iron (Al—Fe), aluminum-iron-silicon (Al—Fe—Si) intermetallic compounds and an amount of about 20 to 70 wt % of iron (Fe) based on the total weight of the alloy layer.

The surface layer may include an amount of about 80 to 100 wt % of aluminum based on the total weight of the surface layer, and may have an average thickness of about 10 to 40 μm. When the average thickness is less than about 10 μm, the corrosion resistance of the aluminum-coated blank may be reduced, and when the average thickness is greater than about 40 μm, the amount of aluminum (Al) incorporated into the joint during joining may increase, so that the mechanical properties of the joint may deteriorate after hot stamping. For example, the average thickness may be about 10 to 30 μm.

The alloy layer may include an amount of about 20 to 70 wt % of iron (Fe) based on the total weight of the alloy layer. Under this condition, the alloy layer may have a high melting point, and thus it is possible to prevent the occurrence of liquid metal embrittlement that is a phenomenon in which the surface layer is melted in a hot-stamping furnace and penetrates into the structure of the base steel sheet. For example, the alloy layer may include an amount of about 20 to 60 wt % of iron (Fe) based on the total weight of the alloy layer.

Joint

The joint may be formed by aligning the aluminum-coated steel sheets so as to face each other and then melting the steel sheets by laser irradiation. The joint may include a composition that does not form ferrite at a temperature equal to or greater than the highest Ac3 temperature among the Ac3 temperatures of the two or more aluminum-coated steel sheets, and may contain a greater amount of an austenite stabilizing element than the base steel sheets. The austenite stabilizing element may include at least one of carbon (C) and manganese (Mn).

The joint may include an amount of about 0.2 to 2.0 wt % of aluminum (Al) based on the total weight of the joint or a composition constituting the joint. The content of aluminum in the joint may be the sum of aluminum (Al) of the molten base steel sheets and aluminum (Al) incorporated from the coating layer. When the aluminum (Al) content of the joint is less than about 0.2 wt %, the process cost may increase because the coating layer needs to removed when joining the aluminum-coated steel sheets, and if the aluminum (Al) content of the joint is greater than about 2.0 wt %, the martensite fraction of the joint may be reduced after hot stamping, resulting in deterioration in the mechanical properties of the aluminum-coated blank. Preferably, the joint may include an amount of about 0.2 to 1.0 wt % of aluminum based on the total weight of the joint or a composition constituting the joint. Meanwhile, when the joint contains greater than about 1.0 wt % of aluminum, a problem may arise in that a large amount of an oxide layer is formed on the surface of the joint.

Preferably, a hot-stamped member may be manufactured by heating the aluminum-coated blank, which includes two or more aluminum-coated steel sheets connected together by a joint, to a temperature equal to or higher than the Ac3 temperature, and then press-molding the aluminum-coated blank, followed by cooling to a temperature of about 300° C. or below at an average cooling rate of about 10 to 500° C./sec.

A portion of the hot-stamped member, which corresponds to the aluminum-coated steel sheets and the joint, may have a greater tensile strength than the aluminum-coated steel sheets and joint of the blank. In particular, the joint of the blank has a microstructure including about 90 area % or greater of martensite. For example, the joint of the blank may have a microstructure including about 90 area % to 100 area % of martensite.

The average hardness values of the aluminum-coated steel sheets o may be different from each other. Preferably, the average hardness value of the joint may be greater than the average hardness value of the aluminum-coated steel sheet having the greatest average hardness value among the two aluminum-coated steel sheets connected together by the joint. More preferably, the lowest hardness value of the joint may be greater than the greatest average hardness value. The two or more aluminum-coated steel sheets having at least one of different strengths and thicknesses may be joined. When the steel sheets have different strengths, they have different average hardness values.

After the aluminum-coated blank is subjected to hot-stamping molding by heating to the Ac3 temperature or above, press molding, and cooling to about 300° C. or below at a cooling rate of about 10 to 500° C./sec, the average hardness of the joint is greater than the average hardness value of each of the two base steel sheets.

Method for Manufacturing Aluminum-Coated Blank

In an aspect, provided is a method for manufacturing the aluminum-coated blank. The method for manufacturing the aluminum-coated blank may include: (S10) a steel sheet aligning step and (S20) a steel sheet joining step.

The method for manufacturing the aluminum-coated blank includes: (S10) a steel sheet aligning step of aligning two or more aluminum-coated steel sheets such that the edge of one of the aluminum-coated steel sheets faces the edge of the other aluminum-coated steel sheet; and (S20) a steel sheet joining step of providing a filler wire to the facing portions of the aluminum-coated steel sheets, and melting the facing portions of the aluminum-coated steel sheets and the filler wire by laser beam irradiation from a laser head to form a joint.

Hereinafter, each step of the method for manufacturing the aluminum-coated blank will be described in detail.

(S10) Steel Sheet Aligning Step

This step is a step of aligning two or more aluminum-coated steel sheets such that the edge of one of the aluminum-coated steel sheets faces the edge of the other aluminum-coated steel sheet.

The two or more aluminum-coated steel sheets may have at least one of different strengths and thicknesses. When the steel sheets have different strengths, they may have different average hardness values.

Each of the aluminum-coated steel sheets may include: a base steel sheet including an amount of about 0.01 to 0.5 wt % of carbon (C), an amount of about 0.01 to 1.0 wt % of silicon (Si), an amount of about 0.5 to 3.0 wt % of manganese (Mn), an amount greater than 0 but not greater than about 0.05 wt % of phosphorus (P), an amount greater than 0 but not greater than about 0.01 wt % of sulfur (S), an amount greater than 0 but not greater than about 0.1 wt % of aluminum (Al), an amount greater than 0 but not greater than about 0.001 wt % of nitrogen (N), and the balance of iron (Fe), based on the total weight of the base steel sheet, and other inevitable impurities; and a coating layer including aluminum (Al) and formed on at least one surface of the base steel sheet in a coating weight of 20 to 100 g/m$^2$. The aluminum-coated steel sheets that are used in this step may be the same as those described above, and thus detailed description thereof will be omitted.

(S20) Steel Sheet Joining Step

This step is a step of providing a filler wire to the facing portions of the aluminum-coated steel sheets, and melting the facing portions of the aluminum-coated steel sheets and the filler wire by laser beam irradiation from a laser head to form a joint. The laser beam may melt the filler wire and the coating layer and base steel sheet of each of the aluminum-coated steel sheets to form a joint.

Filler Wire

The filler wire may include an austenite stabilizing element. For example, the austenite stabilizing element may include at least one of carbon (C) and manganese (Mn).

The filler wire may be melted and incorporated into the joint, and may control the composition of the joint.

Even if aluminum (Al) in the coating layer formed on the surface of the base steel sheet is incorporated into the melt pool of the joint, the microstructure of the joint has a full martensite structure after hot stamping because the filler wire contains a large amount of an austenite stabilizing element. That is, even if the coating layer is not removed and the components of the coating layer are incorporated into the welding joint, the hardness and strength can be prevented from deteriorating. Thus, the physical properties of the welding joint are not different from the physical properties of the base metal portion, so that the occurrence of fracture in the welding joint may be prevented.

Meanwhile, even if the components of the coating layer are diluted by the filler wire, the components of the filler wire and the components of the coating layer may not be uniformly distributed in the components of the base steel sheet depending on joining conditions. In order to prevent this non-uniform distribution, the aluminum-coated steel sheets may be joined together by irradiating a laser beam so as to form a pattern at a predetermined angle with respect to the formation direction of the joint.

Preferably, the pattern may be formed by movement of one or more of the coated steel sheets and the laser head during the laser beam irradiation.

For example, the laser beam may melt the filler wire and the coating layer and base steel sheet of each of the aluminum-coated steel sheets while moving according to a pattern at a predetermined angle with respect to a direction in which the joint is formed, thereby forming the joint.

In addition, the joint may be formed by relative movement of at least one of the coated steel sheets and the laser head while the laser beam is irradiated together with patterned movement thereof. The term "relative movement" as used herein means that at least one of the coated steel sheets and the laser head moves. Preferably, the laser head may move in a state in which the coated steel sheets are stopped, whereby the joint may be formed.

Figure 2A:
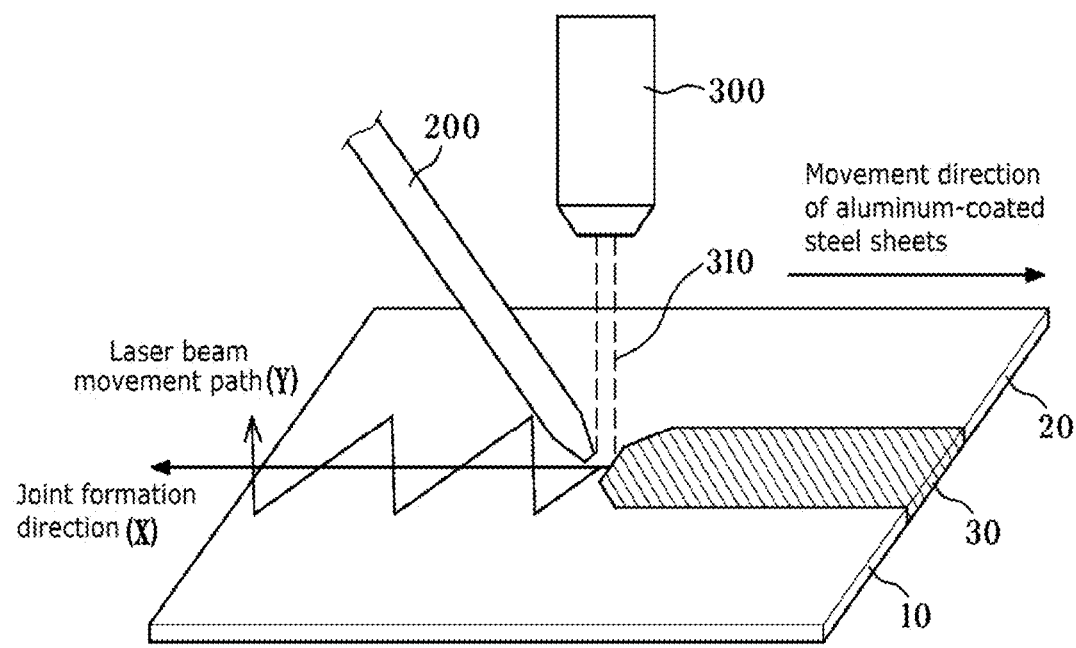
FIG. 2A illustrates an exemplary process of manufacturing an exemplary aluminum-coated blank according to an exemplary embodiment of the present invention.
Figure 2B:
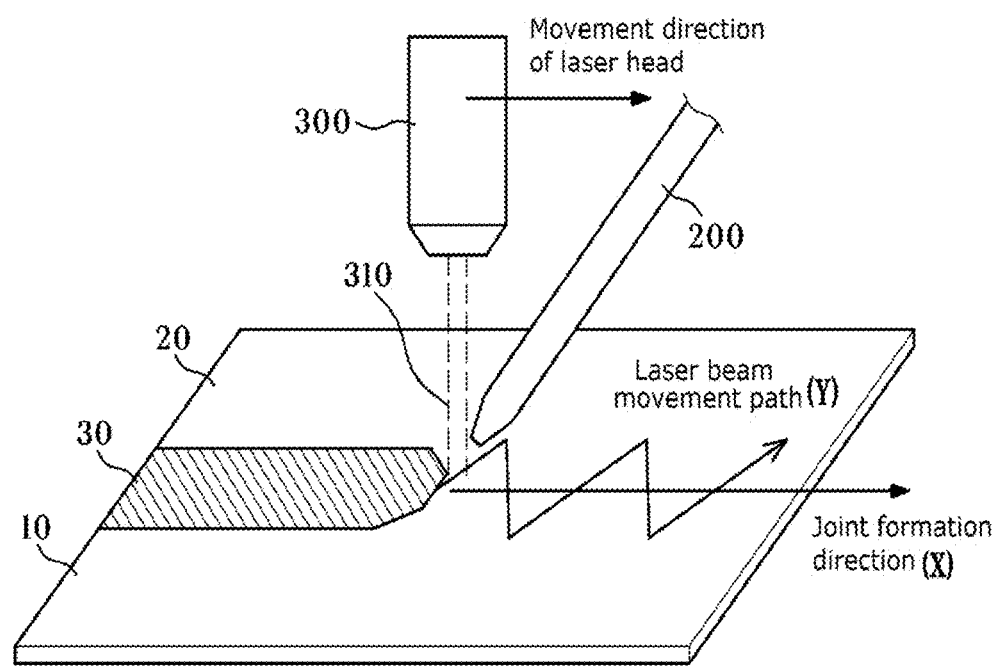
FIG. 2B illustrates an exemplary process of manufacturing an exemplary aluminum-coated blank according to an exemplary embodiment of the present invention.

FIG. 2A illustrates an exemplary process of manufacturing an exemplary aluminum-coated blank according to an exemplary embodiment of the present invention, and FIG. 2B illustrates an exemplary process of manufacturing an exemplary aluminum-coated blank according to an exemplary embodiment of the present invention.

More specifically, FIG. 2A schematically illustrates a process of forming a joint 30 by the patterned movement of aluminum-coated steel sheets 10 and 20, which is an example of the relative movement. For example, a laser beam 310 may be irradiated while a filler wire 200 is supplied toward the facing portions of the aluminum-coated steel sheets 10 and 20 in a state in which a laser head 300 is fixed. At this time, the aluminum-coated steel sheets 10 and 20 may move horizontally (or move in parallel) in a direction opposite to a direction (X) in which the joint 30 is formed, and at the same time, the laser beam 310 may be irradiated while moving according to a pattern at a predetermined angle, thereby forming the joint 30.

FIG. 2B schematically illustrates a process of forming a joint by the patterned movement of the laser beam, which is another example of the relative movement. The laser beam 310 may be irradiated by movement of the laser head 300 while the filler wire 200 is supplied toward the facing portions of the aluminum-coated steel sheets 10 and 20 in a state in which the aluminum-coated steel sheets 10 and 20 are fixed. At this time, the laser head 300 may move horizontally (or move in parallel) in the same direction as the direction (X) in which the joint 30 is formed, and at the same time, the laser beam 310 may be irradiated while moving according to a pattern at a predetermined angle, thereby forming the joint 30.

Preferably, the laser beam may move in a direction different from the movement direction of the laser head. Preferably, the laser beam may move at a predetermined angle with respect to the movement direction of the laser head. For example, the laser beam may move according to a pattern in a direction perpendicular to the movement direction of the laser head.

When the laser head moves, the laser beam may move according to a pattern at an angle ranging from about 45° or greater to less than about 90° with respect to the movement direction of the laser head.

When the aluminum-coated steel sheets move, the laser beam may move according to a pattern at an angle ranging from about 45° or greater to less than about 90° with respect to the formation direction of the joint.

As a result, when the laser beam is irradiated toward the surface of each of the aluminum-coated steel sheets, the laser beam may have a movement pattern having a predetermined angle with respect to the formation direction (X) of the joint on the surface of each of the aluminum-coated steel sheets by at least one of the coated steel sheets and the laser head, which moves horizontally (or moves in parallel) relative to the formation direction X of the joint.

Therefore, the laser beam movement length by which the laser beam moves on the surface of each coated steel sheet may become longer than that in the case where the laser beam is irradiated in the same direction as the formation direction of the joint. Thus, not only the area through which energy may be transferred to the coated steel sheets may be increased, but also the area through which energy is transferred according to the radius of the laser beam may overlap the laser beam movement path. Thus, the components of the coating layer and the components of the filler wire may be sufficiently diluted in the components of the base steel sheets to form the joint.

The laser beam may have a frequency of about 100 to 1,500 Hz and a power of about 1 to 20 kW. In one embodiment, the power of the laser beam may refer to the output value of a laser generating unit, and the frequency of the laser beam may refer to the frequency of patterned movement of the laser beam.

In the process of manufacturing the aluminum-coated blank, in order to ensure minimum productivity and business feasibility, the formation speed of the joint needs to be about 1 m/min or greater, the frequency of the laser beam needs to be about 1,500 Hz or less, and the power of the laser beam needs to be about 20 kW or less. The frequency and power of the laser beam are preferably as high as possible, but a high-performance system is required in order to achieve a frequency greater than about 1,500 Hz and power greater than about 20 kW, and thus problems arise in that the size of the system increases and the system is costly. In addition, in order to ensure minimum productivity, it is necessary to maintain the joining speed of the aluminum-coated steel sheets, that is, the speed at which the joint is formed, at about 1 m/min or greater. The speed at which the joint is formed refers to the displacement per unit time by which the laser head moves horizontally (or moves in parallel) relative to the formation direction of the joint.

The formation speed of the joint may be about 1 to 10 m/min. When the formation speed of the joint is greater than about 10 m/min, the distance of the laser beam movement path may increase even when the laser beam is irradiated under conditions of a frequency of about 100 to 1,500 Hz, a power of about 1 to 20 kW and a laser beam radius of about 0.1 to 1.0 mm. Thus, in this case, there may be a portion in which the components of the coating layer are not sufficiently diluted in the components of the base steel sheet when the coating layer and base steel sheet of each of the aluminum-coated steel sheets are melted by the laser beam.

The formation speed of the joint may be about 15 to 170 mm/sec. Preferably, the formation speed of the joint may be about 1 to 7 m/min. Preferably, the formation speed of the joint may be about 15 to 120 mm/sec.

The laser beam may be irradiated under a condition of a laser beam radius of about 0.1 to 1.0 mm. When the laser beam is irradiated onto the surface of the each coated steel sheet while having a laser beam radius greater than about 1.0 mm, the distance between the filler wire/each coated steel sheet and the laser head that irradiates the laser beam needs to be short. Thus, in this case, when the filler wire needs to be replaced due to the length thereof which gradually becomes shorter as the filler wire is incorporated into the aluminum-coated steel sheets to form the joint, a space to which the filler wire is supplied may be insufficient or a space required for replacement of the filler wire due to complete consumption of the filler wire may be insufficient.

FIG. 3 schematically shows a region in which the components of the coating layer are not sufficiently diluted in the components of the base steel sheet in a process of joining aluminum-coated steel sheets together by irradiating a laser beam having a laser beam radius of less than 0.1 mm. When the laser beam radius is less than about 0.1 mm, the laser beam radius may be small even when the laser beam is radiated under conditions of a frequency of about 100 to 1,500 Hz and a power of about 1 to 20 kW. Thus, in this case, there may be a region (S) in which the components of the coating layer are not sufficiently diluted in the components of the base steel sheet when the coating layer and base steel sheet of each of the aluminum-coated steel sheets 10 and 20 may be melted by the laser beam.

When the frequency of the laser beam is less than about 100 Hz, the distance of the movement path of the laser beam may increase. Thus, in this case, there may be a portion in which the components of the coating layer are not sufficiently diluted in the components of the base steel sheet when the coating layer and base steel sheet of each of the aluminum-coated steel sheets are melted by the laser beam, even when conditions of a laser beam power of about 1 to 20 kW, a laser beam radius of about 0.1 to 1.0 mm and a joint formation speed of about 1 to 7 m/min are satisfied.

When the power of the laser beam is less than about 1 kW, energy that reaches the surface of each of the coated steel sheets may be insufficient, that is, the energy density on the surface of each of the coated steel sheets may be insufficient, even when conditions of a laser beam frequency of about 100 to 1,500 Hz, a laser beam radius of about 0.1 to 1.0 mm and a joint formation speed of about 1 to 7 m/min are satisfied. Thus, in this case, there may be a portion in which the components of the coating layer are not sufficiently diluted in the components of the base steel sheet when the coating layer and base steel sheet of each of the aluminum-coated steel sheets are melted by the laser beam.

During the laser beam irradiation, a first laser beam and a second laser beam, which are spaced apart from each other, may be irradiated. For example, the first laser beam may melt the filler wire, the coating layer and the base steel sheets, and the molten state may be maintained by the second laser beam. Thus, the molten portion may be uniformly stirred, so that the occurrence of segregation in the joint may be prevented and the joint may have excellent quality and mechanical properties. Meanwhile, when the first laser beam and the second laser beam are used, the sum of the powers of the first laser beam and the second laser beam may be about 1 to 20 kW.

In addition, after the aluminum-coated steel sheets are jointed together under the above-described conditions of the laser beam power, radius and frequency and the joint formation speed, and then subjected to heat treatment by heating to a high temperature and rapid cooling, the average hardness of the joint may be greater than the average hardness of each of the aluminum-coated steel sheets. Preferably, the lowest hardness of the joint may be greater than the average hardness of each of the aluminum-coated steel sheets. When the average hardness of the joint is less than the average hardness of each of the aluminum-coated steel sheets, fracture in the joint may be likely to occur when a tensile force is applied to the heat-treated blank. Preferably, after the aluminum-coated blank is subjected to hot-stamping molding by heating to the Ac3 temperature or above, press molding and cooling to about 300° C. or below at a cooling rate of about 10 to 500° C./sec, the average hardness of the joint may be equal to or greater than the average hardness of the base steel sheet.

The joint may be formed at a speed of about 15 to 120 mm/sec, and the frequency of the laser beam, the radius of the laser beam and the formation speed of the joint may satisfy the relationship represented by the following Equation 1:

$$\left(\frac{f \times r}{v}\right)^{\alpha} \geq 1 \qquad \text{[Equation 1]}$$

wherein Equation 1, α is 0.7, f is the frequency (Hz) of the laser beam, r is the radius (mm) of the laser beam, measured on the surface of each of the aluminum-coated steel sheets, and v is the formation speed (mm/sec) of the joint.

Even when the laser beam frequency, power and radius and joint formation speed of Equation 1 are satisfied, the area fraction of aluminum (Al) segregation needs to be lowered in order to ensure the sufficient tensile strength of the joint. To this end, in addition to the frequency, power and radius of the laser beam and the formation speed of the joint, many variables need to be considered, which include an energy loss occurring when the laser beam is transferred to the steel sheets after irradiation from the laser head, the thermal reflectivity of the coating layer, the thermal conductivities of the steel sheets, the thicknesses of the base steel sheets, and the thickness of the coating layer.

In addition, there is difficulty in controlling the radius of the laser beam, because not only the energy density on the surface of each of the aluminum-coated steel sheets should be considered, but also the laser beam movement path on the aluminum-coated steel sheets, which is determined according to the frequency of the laser beam and the formation speed of the joint, should be considered so that energy is evenly transferred to the joint.

Accordingly, the present inventors have excessively repeated experiments and have derived conditions under which the sufficient tensile strength of the joint may be ensured with only the frequency and radius of the laser beam and the formation speed of the joint by using the correction factor (a) determined consideration of the above-described various situations.

When the conditions according to Equation 1 are satisfied, the fraction of aluminum (Al) segregation may be reduced to about 5% or less. However, in this case, the formation speed of the joint may be preferably about 1 to 7 m/min, more preferably about 15 to 120 mm/sec. When the formation speed of the joint is high, a problem may arise in that there is not enough time to evenly transfer energy to the joint. For example, under a condition in which the formation speed of the joint is about 120 to 170 mm/s, Al segregation in the joint may excessively occur even when the conditions of Equation 1 are satisfied.

Meanwhile, even if the area fraction of aluminum (Al) segregation in the joint satisfies about 5% or less, when aluminum (Al) segregation occurs at the interface between the joint and each of the base steel sheets, fracture is highly likely to occur in the joint, specifically at the interface between the joint and each of the steel sheets.

When the pattern angle of the laser beam ranges from about 45° to less than about 90°, it is possible to prevent aluminum (Al) segregation from occurring at the interface between the joint and the base steel sheet. The pattern angle refers to an angle formed between the formation direction (X) of the joint and the movement path (Y) of the laser beam on the surface of each of the coated steel sheets when the joint is formed.

Apparatus for Manufacturing Aluminum-Coated Blank

Figure 4:
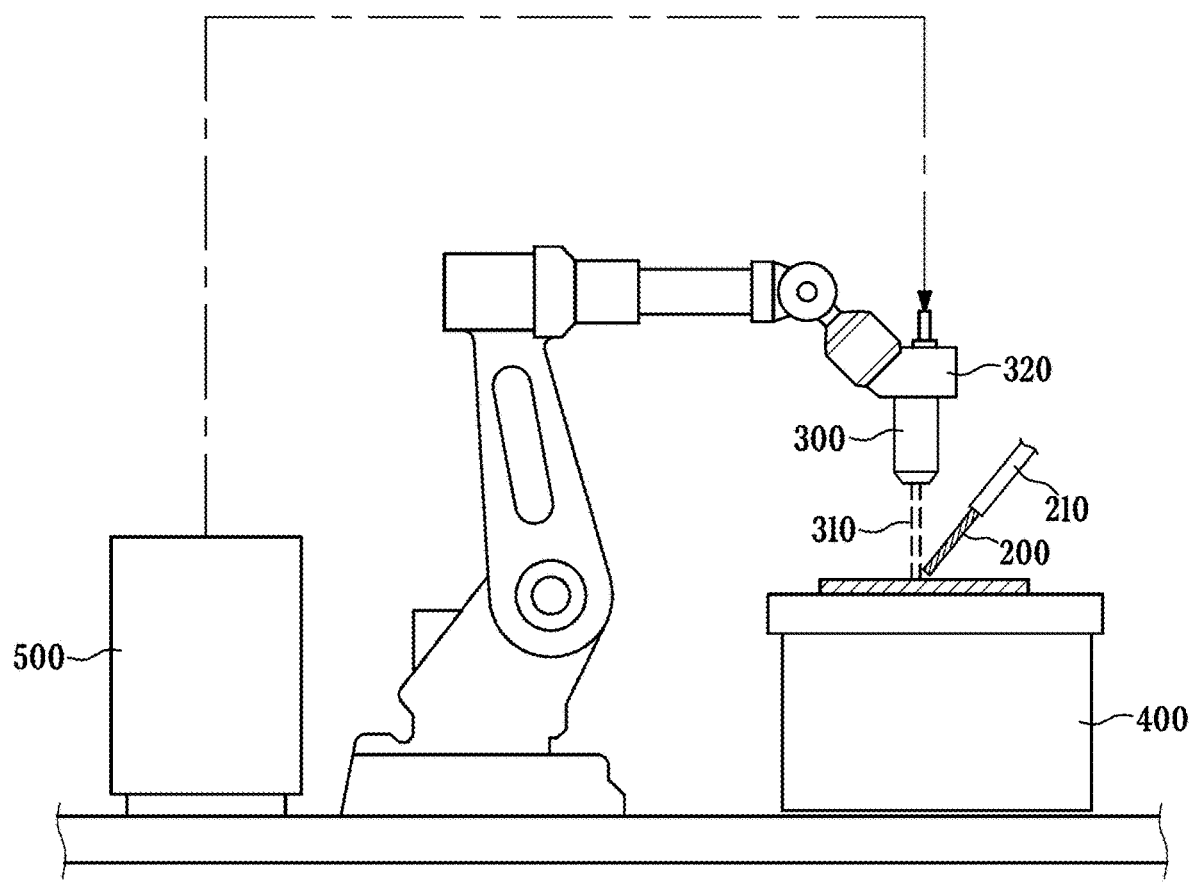
FIG. 4 illustrates an exemplary apparatus for manufacturing an aluminum-coated blank according to an exemplary embodiment of the present invention.

In an aspect, provided is an apparatus for manufacturing the aluminum-coated blank. FIG. 4 illustrates an apparatus for manufacturing an aluminum-coated blank according to an exemplary embodiment of the present invention. An apparatus 1000 for manufacturing an aluminum-coated blank is an apparatus for manufacturing an aluminum-coated blank including two or more aluminum-coated steel sheets connected together by a joint. The apparatus may include: a laser generating unit 500 configured to generate laser light; a steel sheet loading unit 400 on which two or more aluminum-coated steel sheets are disposed such that the edge of one of the aluminum-coated steel sheets faces the edge of the other aluminum-coated steel sheet; a filler wire supply unit 210 configured to supply a filler wire 200 for forming a joint between the coated steel sheets; and a laser head 300 configured to irradiate a laser beam to the facing portions of the aluminum-coated steel sheets and the supplied filler wire using the laser light supplied from the laser generating unit 500.

The laser head 300 may be fastened to a robot arm 320 and may move in a direction opposite to the direction in which the joint is formed.

The aluminum-coated steel sheets may move using the steel sheet loading portion 400 in the same direction as the direction in which the joint is formed.

The steel sheets may be joined together by irradiating a laser beam so as to form a pattern at a predetermined angle with respect to the direction in which the joint is formed, and the laser beam may have a frequency of about 100 to 1,500 Hz and a power of about 1 to 20 kW. The formation speed of the joint may be about 1 to 10 m/min, preferably about 15 to 170 mm/sec.

The aluminum-coated steel sheets that are used in the apparatus may be the same as those described above.

The pattern may be formed by patterned movement of at least one of the coated steel sheets on the steel sheet loading unit and the laser beam.

EXAMPLES

Hereinafter, the configuration and effect of the present invention will be described in more detail with reference to examples. However, these examples are presented as preferred examples of the present invention and cannot be construed as limiting the scope of the present invention in any sense.

Examples 1

Two or more aluminum-coated steel sheets having different strengths and thicknesses were prepared, the aluminum-coated steel sheets each including: a base steel sheet including an amount of 0.01 to 0.5 wt % of carbon (C), an amount of 0.01 to 1.0 wt % of silicon (Si), an amount of 0.5 to 3.0 wt % of manganese (Mn), an amount greater than 0 but not greater than 0.05 wt % of phosphorus (P), an amount greater than 0 but not greater than 0.01 wt % of sulfur (S), an amount greater than 0 but not greater than 0.1 wt % of aluminum (Al), an amount greater than 0 but not greater than 0.001 wt % of nitrogen (N), and the balance of iron (Fe), based on the total weight of the base steel sheet, and other inevitable impurities; and a coating layer formed on at least one surface of the base steel sheet in a coating weight of 20 to 100 g/m$^2$ and containing aluminum (Al).

The coating layer of each of the aluminum-coated steel sheets included: a surface layer formed on the surface of the base steel sheet and containing 80 wt % or more of aluminum (Al); and an alloy layer formed between the surface layer and the base steel sheet and including aluminum-iron (Al—Fe) and aluminum-iron-silicon (Al—Fe—Si) intermetallic compounds and also containing 20 to 70 wt % of iron (Fe) based on the total weight of the alloy layer.

Then, the two or more aluminum-coated steel sheets were disposed on the steel sheet loading unit of the apparatus for manufacturing an aluminum-coated blank as shown in FIG. 4 such that the edge of one of the aluminum-coated steel sheets faced the edge of the other aluminum-coated steel sheet. Thereafter, a filler wire was supplied from the filler wire supply unit to the facing portions of the aluminum-coated steel sheets, and the facing portions of the aluminum-coated steel sheets and the filler wire were melted by laser beam irradiation to form a joint, thereby manufacturing an aluminum-coated blank.

The steel sheets were jointed together by irradiating a laser beam so as to form a pattern at a predetermined angle with respect to the formation direction of the joint. Particularly, while the laser head moved horizontally (or moved in parallel) in the same direction as the formation direction of the joint, the laser beam was irradiated while moving according to the pattern at an angle of 60° with respect to the formation direction of the joint. In addition, the laser beam was irradiated under conditions of a frequency of 100 Hz, a laser beam power of 1 kW and a laser beam radius of 0.1 mm, and the joint was formed at a speed of 1 m/min.

Examples 2 to 16 and Comparative Examples 1 to 12

Aluminum-coated blanks were manufactured in the same manner as in Example 1 above, except that aluminum-coated steel sheets were jointed together by applying the laser beam power, beam radius and frequency and joint formation speed conditions shown in Table 1 below.

Experimental Example 1: Hardness Test

Three aluminum-coated blank specimens of each of Examples 1 to 16 and Comparative Examples 1 to 12 were prepared, and then each of the specimens was heated to the austenite single-phase region temperature or above (Ac3 temperature or above) and cooled to a temperature of 300° C. or below at a cooling rate of 10 to 500° C./sec. Then, the average hardness values of the joint and aluminum-coated steel sheets of each aluminum-coated blank were measured. The hardness value of the aluminum-coated blank was measured by applying a load of 300 g according to KS B 0811 (Method for Vickers hardness test for metallic materials) standard. In addition, the KS B 0811 standard is a reference to ISO 6507 standard. The average hardness value of the joint was calculated by measuring the hardness values of five points spaced at regular intervals on the joint of the aluminum-coated blank and averaging the measured hardness values, and the average hardness value of the base steel sheet was calculated by measuring the hardness values of five points, spaced at the same intervals as when measuring the average hardness value of the joint, on the base steel sheet of the aluminum-coated blank, and averaging the measured hardness values.

The case in which the lowest hardness of the joint was equal to or greater than the average hardness of the base steel sheet was determined as "pass", and the case in which the lowest hardness of the joint was lower than the average hardness of the base steel sheet was determined as "fail". The results of the hardness test are shown in Table 1 below.

TABLE 1

| | Beam power (kW) | Beam radius (mm) | Frequency (Hz) | Joint formation speed (m/min) | Hardness test results (pass/fail) |
|---|---|---|---|---|---|
| Example 1 | 1 | 0.1 | 100 | 1 | Pass |
| Example 2 | 1 | 0.1 | 1,500 | 1 | Pass |
| Example 3 | 1 | 0.1 | 100 | 10 | Pass |
| Example 4 | 1 | 0.1 | 1,500 | 10 | Pass |
| Example 5 | 1 | 1 | 100 | 1 | Pass |
| Example 6 | 1 | 1 | 1,500 | 1 | Pass |
| Example 7 | 1 | 1 | 100 | 10 | Pass |
| Example 8 | 1 | 1 | 1,500 | 10 | Pass |
| Comparative Example 1 | 1 | 0.05 | 100 | 1 | Fail |
| Comparative Example 2 | 1 | 0.05 | 1,500 | 1 | Fail |
| Comparative Example 3 | 1 | 0.1 | 90 | 1 | Fail |
| Comparative Example 4 | 1 | 1 | 90 | 1 | Fail |
| Comparative Example 5 | 1 | 1 | 100 | 11 | Fail |
| Comparative Example 6 | 1 | 1 | 1,500 | 11 | Fail |
| Example 9 | 1 | 0.32 | 100 | 1 | Pass |
| Example 10 | 1 | 0.32 | 1,500 | 10 | Pass |
| Example 11 | 10 | 1 | 100 | 1 | Pass |
| Example 12 | 10 | 1 | 1,500 | 10 | Pass |
| Example 13 | 20 | 0.1 | 100 | 1 | Pass |
| Example 14 | 20 | 0.1 | 1,500 | 1 | Pass |
| Example 15 | 20 | 0.1 | 100 | 10 | Pass |
| Example 16 | 20 | 0.1 | 1,500 | 10 | Pass |
| Comparative Example 7 | 20 | 0.05 | 100 | 1 | Fail |
| Comparative Example 8 | 20 | 0.05 | 1,500 | 1 | Fail |
| Comparative Example 9 | 20 | 0.1 | 90 | 1 | Fail |
| Comparative Example 10 | 20 | 1 | 90 | 1 | Fail |
| Comparative Example 11 | 20 | 1 | 100 | 11 | Fail |
| Comparative Example 12 | 20 | 1 | 1,500 | 11 | Fail |

Hereinafter, "energy density" in the present invention is assumed to be "the value obtained by dividing the beam power P (kW) of the laser generating unit by the laser beam area ($\pi \cdot r^2$) on the surface of each steel sheet (wherein r is the radius of the laser beam)".

As shown in Table 1 above, in the case of Examples 1 to 16 satisfying the laser beam irradiation and joint formation speed, the lowest hardness of the joint was equal to or greater than the average hardness of the base steel sheet.

On the other hand, in the case of Comparative Examples 1, 2, 7 and 8, the energy density was sufficient, but the radius of the laser beam was small even though the joint formation speed was set to the minimum. For this reason, there was a portion in which the components of the coating layer were not sufficiently diluted in the components of the base steel sheet when the coating layer and base steel sheet of each of the aluminum-coated steel sheets were melted by the laser beam. Accordingly, the lowest hardness of the joint formed was lower than the average hardness of the base steel sheet.

In the case of Comparative Examples 3, 4, 9 and 10, the radius value of the laser beam was set to the maximum (1.0 mm) and the formation speed of the joint was set to the minimum (1 m/min). However, the distance of the laser beam movement path increased because the frequency was low, and there was a portion in which the components of the coating layer were not sufficiently diluted in the components of the base steel sheet when the coating layer and base steel sheet of each of the aluminum-coated steel sheets were melted by the laser beam. Accordingly, the lowest hardness of the joint formed was lower than the average hardness of the base steel sheet.

In addition, in the case of Comparative Examples 5, 6, 11 and 12, the energy density was sufficient and the beam radius was set to the maximum. However, the formation speed was excessively high, and hence the distance of the laser beam movement path increased, and there was a portion in which the components of the coating layer were not sufficiently diluted in the components of the base steel sheet when the coating layer and base steel sheet of each of the aluminum-coated steel sheets were melted by the laser beam. Accordingly, the lowest hardness of the joint formed was lower than the average hardness of the base steel sheet.

Examples 17 to 68 and Comparative Examples 13 to 52

Aluminum-coated blanks were manufactured in the same manner as in Example 1 above, except that aluminum-coated steel sheets were joined together by applying the laser beam power, beam radius, frequency and joint formation speed conditions shown in Tables 2 to 5 below and the conditions represented by the following Equation 1, and while the laser head moved horizontally (or moved in parallel) in the same direction as the formation direction of the joint, the laser beam was irradiated while moving according to a pattern at an angle of 45° with respect to the formation direction of the joint.

$$\left(\frac{f \times r}{v}\right)^\alpha \geq 1 \quad \text{[Equation 1]}$$

wherein Equation 1, α is 0.7, f is the frequency (Hz) of the laser beam, r is the radius (mm) of the laser beam, measured on the surface of each of the aluminum-coated steel sheets, and v is the formation speed (mm/sec) of the joint.

Experimental Example 2: Measurement of Area Fraction (%) of Aluminum (Al) Segregation in Joint and Tensile Test Three aluminum-coated blank specimens of each of Examples 17 to 68 and Comparative Examples 13 to 52 were prepared, and then each of the specimens was heated to the austenite single-phase region temperature or above (Ac3 temperature or above) and cooled to 300° C. or below at a cooling rate of 10 to 500° C./sec. Thereafter, the area fraction of aluminum segregation in the joint of each specimen was measured and a tensile test for each specimen was performed, and the results are shown in Tables 2 to 5 below. For measurement of the area fraction of aluminum (Al) segregation in the joint, the average value of the area fractions of Al segregation in three specimens was measured, and for the tensile test results, the case in which no fracture occurred in the joints of all the three specimens after applying a tensile force to the specimens was recorded as "pass", and the case in which one or more fractures occurred in the joints was recorded as "fail".

TABLE 2

| | Beam power (kW) | Joint formation speed (m/min) | Beam radius (mm) | Frequency (Hz) | Equation 1 (v:mm/sec) | Area faction (%) of Al segregation | Tensile test results (pass/fail) |
|---|---|---|---|---|---|---|---|
| Example 17 | 1 | 1 | 0.1 | 1,500 | 4.66 | 4.2 | Pass |
| Example 18 | 1 | 1 | 1 | 100 | 3.51 | 3.6 | Pass |
| Example 19 | 1 | 1 | 1 | 1,500 | 23.34 | 5 | Pass |
| Example 20 | 1 | 3 | 0.1 | 1,500 | 2.16 | 1.1 | Pass |
| Example 21 | 1 | 3 | 0.4 | 130 | 1.03 | 1 | Pass |
| Example 22 | 1 | 3 | 0.4 | 1,500 | 5.7 | 3.1 | Pass |
| Example 23 | 1 | 3 | 1 | 100 | 1.63 | 1.1 | Pass |
| Example 24 | 1 | 3 | 1 | 1,500 | 10.82 | 4.2 | Pass |
| Example 25 | 1 | 5 | 0.1 | 1,500 | 1.51 | 1.6 | Pass |
| Example 26 | 1 | 5 | 1 | 100 | 1.14 | 1.2 | Pass |
| Example 27 | 1 | 5 | 1 | 1,500 | 7.57 | 3.9 | Pass |
| Example 28 | 1 | 7 | 0.1 | 1,500 | 1.2 | 1.3 | Pass |
| Example 29 | 1 | 7 | 1 | 1,500 | 5.98 | 3.3 | Pass |
| Comparative Example 13 | 1 | 1 | 0.1 | 100 | 0.7 | 18.7 | Fail |
| Comparative Example 14 | 1 | 1 | 0.1 | 160 | 0.98 | 18.3 | Fail |
| Comparative Example 15 | 1 | 3 | 0.1 | 100 | 0.33 | 14.2 | Fail |
| Comparative Example 16 | 1 | 3 | 0.4 | 100 | 0.86 | 13.6 | Fail |
| Comparative Example 17 | 1 | 5 | 0.1 | 100 | 0.23 | 11.2 | Fail |
| Comparative Example 18 | 1 | 7 | 0.1 | 100 | 0.18 | 19.2 | Fail |
| Comparative Example 19 | 1 | 7 | 1 | 100 | 0.9 | 14.5 | Fail |
| Comparative Example 20 | 1 | 8 | 0.1 | 1,500 | 1.09 | 13.9 | Fail |
| Comparative Example 21 | 1 | 8 | 1 | 1,500 | 5.45 | 15.7 | Fail |
| Comparative Example 22 | 1 | 10 | 1 | 1,500 | 4.66 | 19.5 | Fail |

TABLE 3

| | Beam power (kW) | Joint formation speed (m/min) | Beam radius (mm) | Frequency (Hz) | Equation 1 (v:mm/sec) | Area faction (%) of Al segregation | Tensile test results (pass/fail) |
|---|---|---|---|---|---|---|---|
| Example 30 | 3 | 1 | 0.1 | 1,500 | 4.66 | 4.9 | Pass |
| Example 31 | 3 | 1 | 1 | 100 | 3.51 | 4.8 | Pass |
| Example 32 | 3 | 1 | 1 | 1,500 | 23.34 | 4.8 | Pass |
| Example 33 | 3 | 3 | 0.1 | 1,500 | 2.16 | 2.1 | Pass |
| Example 34 | 3 | 3 | 0.4 | 130 | 1.03 | 0 | Pass |
| Example 35 | 3 | 3 | 0.4 | 1,500 | 5.7 | 3.9 | Pass |
| Example 36 | 3 | 3 | 1 | 100 | 1.63 | 1.2 | Pass |
| Example 37 | 3 | 3 | 1 | 1,500 | 10.82 | 4.6 | Pass |
| Example 38 | 3 | 5 | 0.1 | 1,500 | 1.51 | 1.4 | Pass |
| Example 39 | 3 | 5 | 1 | 100 | 1.14 | 0.9 | Pass |
| Example 40 | 3 | 5 | 1 | 1,500 | 7.57 | 3.1 | Pass |
| Example 41 | 3 | 7 | 0.1 | 1,500 | 1.2 | 1.2 | Pass |
| Example 42 | 3 | 7 | 1 | 1,500 | 5.98 | 3.9 | Pass |
| Comparative Example 23 | 3 | 1 | 0.1 | 100 | 0.7 | 15.1 | Fail |
| Comparative Example 24 | 3 | 1 | 0.1 | 160 | 0.98 | 14.6 | Fail |
| Comparative Example 25 | 3 | 3 | 0.1 | 100 | 0.33 | 12.8 | Fail |
| Comparative Example 26 | 3 | 3 | 0.4 | 100 | 0.86 | 17.7 | Fail |
| Comparative Example 27 | 3 | 5 | 0.1 | 100 | 0.23 | 16.3 | Fail |
| Comparative Example 28 | 3 | 7 | 0.1 | 100 | 0.18 | 16.1 | Fail |
| Comparative Example 29 | 3 | 7 | 1 | 100 | 0.9 | 14.1 | Fail |
| Comparative Example 30 | 3 | 8 | 0.1 | 1,500 | 1.09 | 13.6 | Fail |

TABLE 3-continued

|  | Beam power (kW) | Joint formation speed (m/min) | Beam radius (mm) | Frequency (Hz) | Equation 1 (v:mm/sec) | Area faction (%) of Al segregation | Tensile test results (pass/fail) |
| --- | --- | --- | --- | --- | --- | --- | --- |
| Comparative Example 31 | 3 | 8 | 1 | 1,500 | 5.45 | 11.6 | Fail |
| Comparative Example 32 | 3 | 10 | 1 | 1,500 | 4.66 | 16.7 | Fail |

TABLE 4

|  | Beam power (kW) | Joint formation speed (m/min) | Beam radius (mm) | Frequency (Hz) | Equation 1 (v:mm/sec) | Area faction (%) of Al segregation | Tensile test results (pass/fail) |
| --- | --- | --- | --- | --- | --- | --- | --- |
| Comparative Example 33 | 7 | 1 | 0.1 | 100 | 0.7 | 14.2 | Fail |
| Comparative Example 34 | 7 | 1 | 0.1 | 160 | 0.98 | 16.7 | Fail |
| Comparative Example 35 | 7 | 3 | 0.1 | 100 | 0.33 | 15.2 | Fail |
| Comparative Example 36 | 7 | 3 | 0.4 | 100 | 0.86 | 11.6 | Fail |
| Comparative Example 37 | 7 | 5 | 0.1 | 100 | 0.23 | 11 | Fail |
| Comparative Example 38 | 7 | 7 | 0.1 | 100 | 0.18 | 11.2 | Fail |
| Comparative Example 39 | 7 | 7 | 1 | 100 | 0.9 | 12.6 | Fail |
| Comparative Example 40 | 7 | 8 | 0.1 | 1,500 | 1.09 | 13.2 | Fail |
| Comparative Example 41 | 7 | 8 | 1 | 1,500 | 5.45 | 17 | Fail |
| Comparative Example 42 | 7 | 10 | 1 | 1,500 | 4.66 | 19.5 | Fail |
| Example 43 | 7 | 1 | 0.1 | 1,500 | 4.66 | 5 | Pass |
| Example 44 | 7 | 1 | 1 | 100 | 3.51 | 4.1 | Pass |
| Example 45 | 7 | 1 | 1 | 1,500 | 23.34 | 4.9 | Pass |
| Example 46 | 7 | 3 | 0.1 | 1,500 | 2.16 | 1.1 | Pass |
| Example 47 | 7 | 3 | 0.4 | 130 | 1.03 | 1 | Pass |
| Example 48 | 7 | 3 | 0.4 | 1,500 | 5.7 | 3.9 | Pass |
| Example 49 | 7 | 3 | 1 | 100 | 1.63 | 1.8 | Pass |
| Example 50 | 7 | 3 | 1 | 1,500 | 10.82 | 4.1 | Pass |
| Example 51 | 7 | 5 | 0.1 | 1,500 | 1.51 | 1.7 | Pass |
| Example 52 | 7 | 5 | 1 | 100 | 1.14 | 1.2 | Pass |
| Example 53 | 7 | 5 | 1 | 1,500 | 7.57 | 3.5 | Pass |
| Example 54 | 7 | 7 | 0.1 | 1,500 | 1.2 | 1.9 | Pass |
| Example 55 | 7 | 7 | 1 | 1,500 | 5.98 | 3.4 | Pass |

TABLE 5

|  | Beam power (kW) | Joint formation speed (m/min) | Beam radius (mm) | Frequency (Hz) | Equation 1 (v:mm/sec) | Area faction (%) of Al segregation | Tensile test results (pass/fail) |
| --- | --- | --- | --- | --- | --- | --- | --- |
| Comparative Example 43 | 20 | 1 | 0.1 | 100 | 0.7 | 12.2 | Fail |
| Comparative Example 44 | 20 | 1 | 0.1 | 160 | 0.98 | 10.9 | Fail |
| Comparative Example 45 | 20 | 3 | 0.1 | 100 | 0.33 | 15.2 | Fail |
| Comparative Example 46 | 20 | 3 | 0.4 | 100 | 0.86 | 14 | Fail |
| Comparative Example 47 | 20 | 5 | 0.1 | 100 | 0.23 | 15.5 | Fail |
| Comparative Example 48 | 20 | 7 | 0.1 | 100 | 0.18 | 20.9 | Fail |
| Comparative Example 49 | 20 | 7 | 1 | 100 | 0.9 | 12.2 | Fail |
| Comparative Example 50 | 20 | 8 | 0.1 | 1,500 | 1.09 | 13.9 | Fail |

TABLE 5-continued

|  | Beam power (kW) | Joint formation speed (m/min) | Beam radius (mm) | Frequency (Hz) | Equation 1 (v:mm/sec) | Area faction (%) of Al segregation | Tensile test results (pass/fail) |
| --- | --- | --- | --- | --- | --- | --- | --- |
| Comparative Example 51 | 20 | 8 | 1 | 1,500 | 5.45 | 12.7 | Fail |
| Comparative Example 52 | 20 | 10 | 1 | 1,500 | 4.66 | 16.1 | Fail |
| Example 56 | 20 | 1 | 0.1 | 1,500 | 4.66 | 3.9 | Pass |
| Example 57 | 20 | 1 | 1 | 100 | 3.51 | 4 | Pass |
| Example 58 | 20 | 1 | 1 | 1,500 | 23.34 | 3 | Pass |
| Example 59 | 20 | 3 | 0.1 | 1,500 | 2.16 | 1.9 | Pass |
| Example 60 | 20 | 3 | 0.4 | 130 | 1.03 | 1.3 | Pass |
| Example 61 | 20 | 3 | 0.4 | 1,500 | 5.7 | 3.2 | Pass |
| Example 62 | 20 | 3 | 1 | 100 | 1.63 | 0 | Pass |
| Example 63 | 20 | 3 | 1 | 1,500 | 10.82 | 5 | Pass |
| Example 64 | 20 | 5 | 0.1 | 1,500 | 1.51 | 1.2 | Pass |
| Example 65 | 20 | 5 | 1 | 100 | 1.14 | 1.3 | Pass |
| Example 66 | 20 | 5 | 1 | 1,500 | 7.57 | 4.4 | Pass |
| Example 67 | 20 | 7 | 0.1 | 1,500 | 1.2 | 1.3 | Pass |
| Example 68 | 20 | 7 | 1 | 1,500 | 5.98 | 3 | Pass |

As shown in Tables 2 to 5 above, in the case of Examples 17 to 68, the conditions of Equation 1 were satisfied, the area fraction of aluminum segregation in the joint satisfied 5% or less, and the tensile test results indicated that no fracture in the joint occurred (pass). However, in the case of Comparative Examples 13 to 52 that did not satisfy the conditions of the present invention, when the conditions of Equation 1 of the present invention were not satisfied, the area fraction of aluminum segregation in the joint exceeded 5%, and fracture in the joint occurred in the tensile test. In addition, when the joint formation speed exceeded 7 m/min even though the conditions of Equation 1 were satisfied, the laser beam did not sufficiently stir the inside of the base steel sheet due to the high formation speed of the joint, and hence aluminum segregation excessively occurred, and fracture in the joint occurred in the tensile test.

Examples 69 to 98 and Comparative Examples 53 to 72

Aluminum-coated blanks were manufactured in the same manner as in Example 1 above, except that aluminum-coated steel sheets were joined together by applying the laser beam power, joint formation speed, beam radius and frequency conditions shown in Tables 6 and 7 below, and while the laser head moved parallel (or moved horizontally) in the same direction as the formation direction of the joint, the laser beam was irradiated at each of the pattern angles shown in Tables 6 and 7 below with respect to the formation direction of the joint. In this case, the pattern angle refers to an angle formed between the formation direction (X) of the joint and the movement path (Y) of the laser beam on the surface of each of the coated steel sheets when the joint is formed.

Experimental Example 3: Measurement of Area Fraction (%) of Aluminum (Al) Segregation in Joint and Examination as to Whether Aluminum Segregation at Joint Interface and Fracture in Joint Occur Three aluminum-coated blank specimens of each of Examples 69 to 98 and Comparative Examples 53 to 72 were prepared, and then each of the specimens was heated to the austenite single-phase region temperature or above (Ac3 temperature or above) and cooled to 300° C. or below at a cooling rate of 10 to 500° C./sec. Thereafter, the area fraction of aluminum segregation in the joint of each specimen was measured, whether aluminum segregation at the joint interface occurred was examined, and a tensile test for each specimen was performed. The results are shown in Tables 6 and 7 below. For measurement of the area fraction of aluminum (Al) segregation in the joint, the average value of the area fractions of Al segregation in three specimens was measured, and for the tensile test results, the case in which no fracture occurred in the joints of all the three specimens after applying a tensile force to the specimens was recorded as "X", and the case in which one or more fractures occurred in the joints was recorded as "O".

TABLE 6

|  | Beam power (kW) | Joint formation speed (m/min) | Beam radius (mm) | Frequency (Hz) | Pattern angle (degree) | Area fraction of Al segregation | Al segregation at joint interface | Fracture in joint |
| --- | --- | --- | --- | --- | --- | --- | --- | --- |
| Comparative Example 53 | 3 | 1 | 0.1 | 1,500 | 20 | 4.8 | Occurred | ○ |
| Comparative Example 54 |  |  |  |  | 40 | 4.1 | Occurred | ○ |
| Example 69 |  |  |  |  | 45 | 4.9 | Did not occur | X |
| Example 70 |  |  |  |  | 60 | 4.1 | Did not occur | X |
| Example 71 |  |  |  |  | 85 | 3.2 | Did not occur | X |

TABLE 6-continued

| | Beam power (kW) | Joint formation speed (m/min) | Beam radius (mm) | Frequency (Hz) | Pattern angle (degree) | Area fraction of Al segregation | Al segregation at joint interface | Fracture in joint |
|---|---|---|---|---|---|---|---|---|
| Comparative Example 55 | 3 | 1 | 1 | 100 | 20 | 4.8 | Occurred | ○ |
| Comparative Example 56 | | | | | 40 | 4.2 | Occurred | ○ |
| Example 72 | | | | | 45 | 0 | Did not occur | X |
| Example 73 | | | | | 60 | 4.1 | Did not occur | X |
| Example 74 | | | | | 85 | 3.4 | Did not occur | X |
| Comparative Example 57 | 3 | 1 | 1 | 1,500 | 20 | 4.8 | Occurred | ○ |
| Comparative Example 58 | | | | | 40 | 4.3 | Occurred | ○ |
| Example 75 | | | | | 45 | 0 | Did not occur | X |
| Example 76 | | | | | 60 | 4.5 | Did not occur | X |
| Example 77 | | | | | 85 | 3.1 | Did not occur | X |
| Comparative Example 59 | 3 | 7 | 0.1 | 1,500 | 20 | 3.2 | Occurred | ○ |
| Comparative Example 60 | | | | | 40 | 2.2 | Occurred | ○ |
| Example 78 | | | | | 45 | 1.2 | Did not occur | X |
| Example 79 | | | | | 60 | 1.8 | Did not occur | X |
| Example 80 | | | | | 85 | 0.5 | Did not occur | X |
| Comparative Example 61 | 3 | 7 | 1 | 1,500 | 20 | 4.7 | Occurred | ○ |
| Comparative Example 62 | | | | | 40 | 4.2 | Occurred | ○ |
| Example 81 | | | | | 45 | 3.9 | Did not occur | X |
| Example 82 | | | | | 60 | 1.5 | Did not occur | X |
| Example 83 | | | | | 85 | 0 | Did not occur | X |

TABLE 7

| | Beam power (kW) | Joint formation speed (m/min) | Beam radius (mm) | Frequency (Hz) | Pattern angle (degree) | Area fraction of Al segregation | Al segregation at joint interface | Fracture in joint |
|---|---|---|---|---|---|---|---|---|
| Comparative Example 63 | 7 | 1 | 0.1 | 1,500 | 20 | 4.6 | Occurred | ○ |
| Comparative Example 64 | | | | | 40 | 4.1 | Occurred | ○ |
| Example 84 | | | | | 45 | 5 | Did not occur | X |
| Example 85 | | | | | 60 | 4.1 | Did not occur | X |
| Example 86 | | | | | 85 | 3.9 | Did not occur | X |
| Comparative Example 65 | 7 | 1 | 1 | 100 | 20 | 4.7 | Occurred | ○ |
| Comparative Example 66 | | | | | 40 | 3.9 | Occurred | ○ |
| Example 87 | | | | | 45 | 3.5 | Did not occur | X |
| Example 88 | | | | | 60 | 3.5 | Did not occur | X |
| Example 89 | | | | | 85 | 3.5 | Did not occur | X |
| Comparative Example 67 | 7 | 1 | 1 | 1,500 | 20 | 4.7 | Occurred | ○ |
| Comparative Example 68 | | | | | 40 | 4.5 | Occurred | ○ |

TABLE 7-continued

| | Beam power (kW) | Joint formation speed (m/min) | Beam radius (mm) | Frequency (Hz) | Pattern angle (degree) | Area fraction of Al segregation | Al segregation at joint interface | Fracture in joint |
|---|---|---|---|---|---|---|---|---|
| Example 90 | | | | | 45 | 4.9 | Did not occur | X |
| Example 91 | | | | | 60 | 4.1 | Did not occur | X |
| Example 92 | | | | | 85 | 2.8 | Did not occur | X |
| Comparative Example 69 | 7 | 7 | 0.1 | 1500 | 20 | 4.9 | Occurred | ○ |
| Comparative Example 70 | | | | | 40 | 3.5 | Occurred | ○ |
| Example 93 | | | | | 45 | 1.9 | Did not occur | X |
| Example 94 | | | | | 60 | 1.8 | Did not occur | X |
| Example 95 | | | | | 85 | 1.1 | Did not occur | X |
| Comparative Example 71 | 7 | 7 | 1 | 1,500 | 20 | 4.8 | Occurred | ○ |
| Comparative Example 72 | | | | | 40 | 3.8 | Occurred | ○ |
| Example 96 | | | | | 45 | 3.4 | Did not occur | X |
| Example 97 | | | | | 60 | 2.8 | Did not occur | X |
| Example 98 | | | | | 85 | 1.9 | Did not occur | X |

Meanwhile, when aluminum (Al) segregation at the interface between the joint and the base steel sheet occurs even though the area fraction of aluminum segregation in the joint satisfies 5% or less, fracture is highly likely to occur in the joint, specifically at the interface between the joint and each steel sheet. Referring to the results shown in Tables 6 and 7 above, it could be seen that, in the case of the Examples to which a pattern angle ranging from 45° to less than 90° was applied, the area fraction of aluminum segregation in the joint was 5% or less, the occurrence of aluminum (Al) segregation at the interface between the joint and the base steel sheet could be prevented, and fracture in the joint during the tensile test was prevented. On the other hand, it could be seen that, in the case of Comparative Examples 53 to 72 to which a pattern angle smaller than 45° was applied, aluminum segregation at the joint interface occurred and fracture in the joint occurred.

FIG. 5A is an optical micrograph showing the cross-section of an aluminum-coated blank manufactured according to a conventional method by joining aluminum-coated steel sheets together using a laser beam without applying a laser beam a predetermined pattern angle, and FIG. 5B is an optical micrograph showing the cross-section of the aluminum-coated blank of Example 1. As shown in FIG. 5, when the conventional method that does not apply a laser beam at a predetermined pattern angle was applied, the components of the coating layer were not sufficiently diluted in the components of the base steel sheet, and thus the area fraction of aluminum segregation in the joint increased, whereas, in the case of Example 1, the components of the coating layer were sufficiently diluted in the components of the base steel sheet, so that the occurrence of aluminum segregation in the joint could be minimized.

Figure 6A:
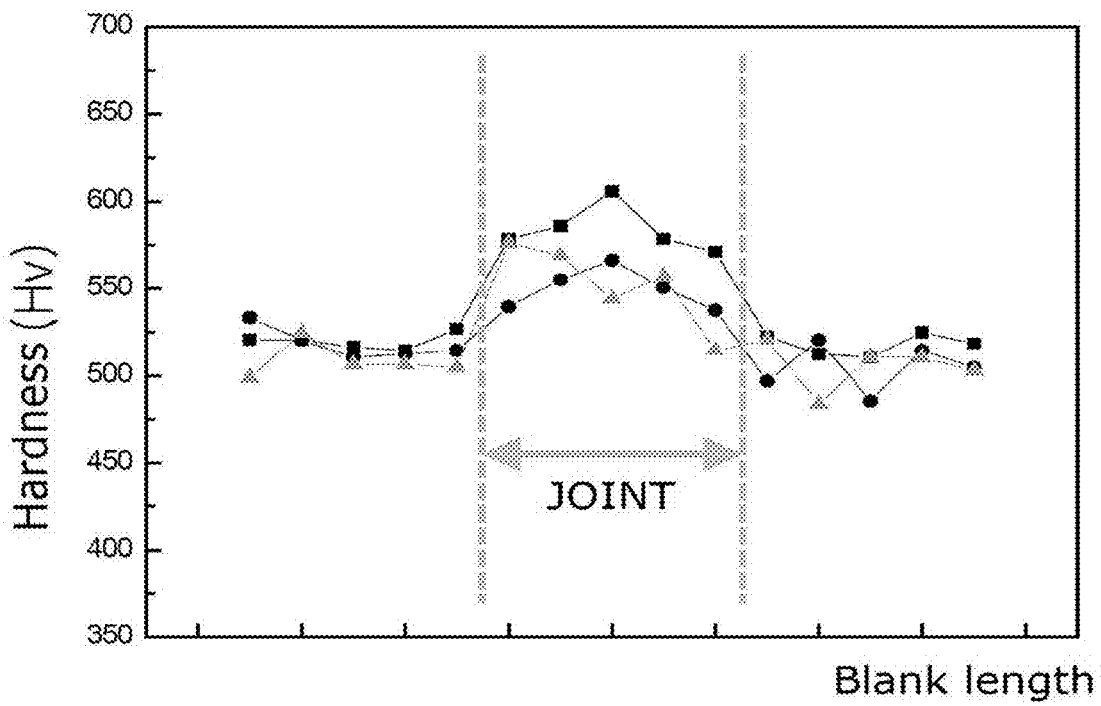
FIG. 6A is a graph showing a change in hardness for each region after hot-stamping molding of an aluminum-coated blank of Example 7.
Figure 6B:
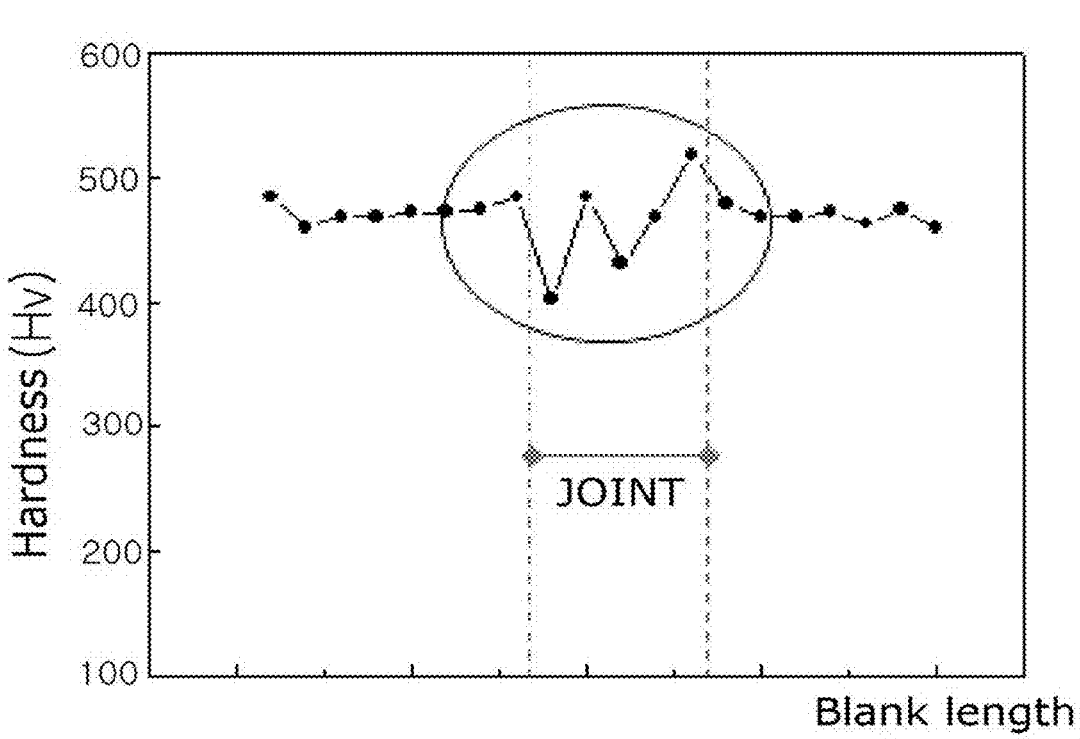
FIG. 6B is a graph showing a change in hardness for each region after hot-stamping molding of an aluminum-coated blank of Comparative Example 5.

FIG. 6A is a graph showing a change in hardness for each region after hot-stamping molding of the aluminum-coated blank of Example 7, and FIG. 6B is a graph showing a change in hardness for each region after hot-stamping molding of the aluminum-coated blank of Comparative Example 5. As shown in FIG. 6A and FIG. 6B, in the case of Example 7, the lowest hardness of the joint after hot-stamping molding was equal to or greater than the average hardness of the base steel sheet, but in the case of Comparative Example 5 that did not satisfy the conditions of the present invention, the lowest hardness of the joint after hot-stamping molding was lower than the average hardness of the base steel sheet.

FIG. 7A is an optical micrograph showing the cross-section of the aluminum-coated blank of Example 34, and FIG. 7B is an optical micrograph showing the cross-section of the aluminum-coated blank of Comparative Example 28. As shown in FIG. 7A and FIG. 7B, in the case of the aluminum-coated blank of Example 34, aluminum segregation in the joint was minimized, but in the case of Comparative Example 28 that did not satisfy the conditions of Equation 1, the occurrence of aluminum segregation in the joint increased compared to Example 34.

Simple modifications or alterations of the present invention may be easily made by those skilled in the art, and such modifications or alterations may all be considered falling within the scope of the present invention.

What is claimed is:

1. A method for manufacturing an aluminum-coated blank, comprising:
   aligning two or more aluminum-coated steel sheets such that an edge of one of the aluminum-coated steel sheets faces an edge of the other aluminum-coated steel sheet; and
   providing a filler wire to the facing portions of the aluminum-coated steel sheets, and melting the facing portions of the aluminum-coated steel sheets and the filler wire by laser beam irradiation from a laser head to form a joint,
   wherein the steel sheets are joined together by irradiating a laser beam so as to form a pattern angle that is formed between the formation direction of the joint and the movement path of the laser beam on the surface of each of the coated steel sheets, the pattern angle ranges from about 45° to less than about 90°,
the laser beam has a frequency of about 100 to 1,500 Hz and a power of about 1 to 20 kW,
the joint is formed at a speed of about 15 to 120 mm/sec,
a radius of the laser beam is greater than 0.5 and less than 1 mm, and
each of the aluminum-coated steel sheets comprises: a base steel sheet comprising an amount of about 0.01 to 0.5 wt % of carbon (C), an amount of about 0.01 to 1.0 wt % of silicon (Si), an amount of about 0.5 to 3.0 wt % of manganese (Mn), an amount of greater than 0 but not greater than about 0.05 wt % of phosphorus (P), an amount of greater than 0 but not greater than about 0.01 wt % of sulfur (S), an amount of greater than 0 but not greater than about 0.1 wt % of aluminum (Al), an amount of greater than 0 but not greater than about 0.001 wt % of nitrogen (N), and the balance of iron (Fe) and other inevitable impurities; and
a coating layer comprising aluminum (Al) and formed on at least one surface of the base steel sheet in a coating weight of 20 to 100 g/m$^2$, wherein the coating layer comprises a surface layer formed on the surface of the base steel sheet and containing 80 wt % or more of aluminum (Al) based on the total weight of the surface layer; and wherein the coating layer comprises an alloy layer formed between the surface layer and the base steel sheet and containing aluminum-iron (Fe), aluminum-iron-silicon (Al-Fe-Si) intermetallic compounds, and an amount of 20 to 70 wt % of iron (Fe) based on the total weight of the alloy layer,
wherein the joint comprises a composition comprising an amount of about 0.2 to 2.0 wt % of aluminum (Al) based on the total weight of the composition, the composition does not form ferrite at a temperature equal to or greater than the highest Ac3 temperature among Ac3 temperatures of the two or more aluminum-coated steel sheets,
wherein the frequency of the laser beam, the radius of the laser beam and the speed at which the joint is formed satisfy a relationship represented by the following Equation 1:

$$\left(\frac{f \times r}{v}\right)^{\alpha} \geq 1 \qquad \text{[Equation 1]}$$

wherein a is 0.7, f is the frequency (Hz) of the laser beam, r is the radius (mm) of the laser beam, measured on the surface of each of the aluminum-coated steel sheets, and v is the speed (mm/sec) at which the joint is formed,
wherein an area fraction of aluminum segregation in the joint is 5% or less,
wherein an interface between the joint and the base steel sheet does not include aluminum segregation,
wherein, after the aluminum-coated blank is subjected to hot-stamping molding by heating to the Ac3 temperature, press molding, and cooling to about 300° C. or below at a cooling rate of about 10 to 500° C./sec, a minimum hardness of the joint is greater than an average hardness of the base steel sheet, and
wherein the filler wire comprises carbon (C).

2. The method of claim 1, wherein the filler wire further comprises manganese (Mn).

3. The method of claim 1, wherein the pattern is formed by movement of one or more of the coated steel sheets and the laser head during the laser beam irradiation.

* * * * *